United States Patent [19]
Mizunuma et al.

[11] Patent Number: 5,351,570
[45] Date of Patent: Oct. 4, 1994

[54] ELECTRONICALLY CONTROLLED AUTOMATIC TRANSMISSION FOR VEHICLES

[75] Inventors: Wataru Mizunuma; Mitsumasa Yahata; Kaoru Watanabe; Kensaku Nakajima; Jun Kato; Yukihiro Masuko; Yoshihiko Shimada, all of Sagamihara, Japan

[73] Assignee: Mitsubishi Jukogyo Kabushiki Kaisha, Tokyo, Japan

[21] Appl. No.: 995,266

[22] Filed: Dec. 21, 1992

[30] Foreign Application Priority Data

Dec. 19, 1991 [JP] Japan .................. 3-337052
Feb. 13, 1992 [JP] Japan .................. 4-026583

[51] Int. Cl.5 .............. F16H 59/00; B60K 20/10; B60K 20/04
[52] U.S. Cl. .................. 74/335; 74/473 R; 74/866; 477/122; 477/125; 475/123; 475/132
[58] Field of Search .......... 74/335, 473 R, 866; 364/424.1

[56] References Cited

U.S. PATENT DOCUMENTS

| | | | |
|---|---|---|---|
| 3,292,450 | 12/1966 | Hurst et al. | 74/473 R |
| 4,598,374 | 7/1986 | Klatt | 364/424.1 |
| 4,912,997 | 4/1990 | Malcolm et al. | 74/473 R X |
| 4,987,792 | 1/1991 | Mueller et al. | 74/335 X |
| 4,991,454 | 2/1991 | Bulgrien | 74/473 R X |
| 5,009,128 | 4/1991 | Seidel et al. | 74/335 X |
| 5,038,627 | 8/1991 | Schwaiger et al. | 74/335 |
| 5,044,220 | 9/1991 | Raff et al. | 74/473 R |
| 5,050,456 | 9/1991 | Fukuda | 74/866 |
| 5,062,314 | 11/1991 | Maier et al. | 74/475 |
| 5,070,740 | 12/1991 | Giek et al. | 74/335 X |
| 5,127,288 | 7/1992 | Hojo et al. | 74/866 |
| 5,157,989 | 10/1992 | Asada | 74/866 |
| 5,178,042 | 1/1993 | Moroto et al. | 74/335 X |
| 5,205,180 | 4/1993 | Moroto et al. | 74/335 X |

FOREIGN PATENT DOCUMENTS

| | | |
|---|---|---|
| 0108209 | 5/1984 | European Pat. Off. . |
| 0331797 | 9/1989 | European Pat. Off. . |
| 0353310 | 2/1990 | European Pat. Off. . |
| 450286 | 10/1991 | European Pat. Off. ........ 74/335 |
| 0467773 | 1/1992 | European Pat. Off. . |
| 3717675 | 12/1988 | Fed. Rep. of Germany . |
| 4042045 | 7/1991 | Fed. Rep. of Germany ...... 74/335 |
| 4124550 | 2/1992 | Fed. Rep. of Germany . |
| 4-46267 | 2/1992 | Japan ........................ 74/335 |
| 4-69446 | 3/1992 | Japan ........................ 74/335 |
| WO90/04225 | 4/1990 | World Int. Prop. O. . |

*Primary Examiner*—Leslie A. Braun
*Assistant Examiner*—Andrea Pitts
*Attorney, Agent, or Firm*—Jacobson, Price, Holman & Stern

[57] ABSTRACT

(1) Various gear states are selected by movement of a shift lever 2 in a longitudinal shift path 13 and the gear stage is automatically shifted from starting to the maximum gear stage in an automatic speed change position D, so that an operator can run a vehicle with increased safety and easy operation without operation of the shift lever 2. (2) When a push button switch 3 provided in the shift lever 1 is pressed during the automatic speed change running, the gear stage during the running is fixed, so that inadvertent automatic shift is prevented and an optimum speed stage is maintained when the work load on the vehicle's engine changes, for example when the vehicle encounters a slope or a change in load during in operation. (3) When the gear stage is fixed in the automatic speed change position D and the shift lever 2 is transversely moved in the transverse shift path 14, the operator can vary the stages while varying one stage a time with the operator's will. That is, the manual speed change or transmission can be selected regardless of the automatic speed change state. The operator can switch the transmission state to the automatic transmission state or the manual transmission state in accordance with various running states and operation states to thereby improve the operation efficiency of the operation vehicle.

8 Claims, 20 Drawing Sheets

FIG. 13

| | | FORWARD CLUTCH | BACKWARD CLUTCH | 1/5 GEAR BRAKE | 2/6 GEAR BRAKE | 3/7 GEAR BRAKE | 4/8 GEAR BRAKE | LOW-SPEED BRAKE | HIGH-SPEED BRAKE |
|---|---|---|---|---|---|---|---|---|---|
| FORWARD | 1ST GEAR | ○ | | ○ | | | | ○ | |
| | 2ND GEAR | ○ | | | ○ | | | ○ | |
| | 3RD GEAR | ○ | | | | ○ | | ○ | |
| | 4TH GEAR | ○ | | | | | ○ | ○ | |
| | 5TH GEAR | ○ | | ○ | | | | | ○ |
| | 6TH GEAR | ○ | | | ○ | | | | ○ |
| | 7TH GEAR | ○ | | | | ○ | | | ○ |
| | 8TH GEAR | ○ | | | | | ○ | | ○ |
| BACKWARD | 1ST GEAR | | ○ | ○ | | | | ○ | |
| | 2ND GEAR | | ○ | | ○ | | | ○ | |
| | 3RD GEAR | | ○ | | | ○ | | ○ | |
| | 4TH GEAR | | ○ | | | | ○ | ○ | |
| | 5TH GEAR | | ○ | ○ | | | | | ○ |
| | 6TH GEAR | | ○ | | ○ | | | | ○ |
| | 7TH GEAR | | ○ | | | ○ | | | ○ |
| | 8TH GEAR | | ○ | | | | ○ | | ○ |
| | NEUTRAL (PARKING) | ○ | | | | | | | |

FIG. 16

| | | NEUTRAL SOLENOID VALVE 812 | LOW-SPEED SOLENOID VALVE 813 | 3/7 GEAR SOLENOID VALVE 822 | 1/5 GEAR SOLENOID VALVE 823 | 4/8 GEAR SOLENOID VALVE 826 | 2/6 GEAR SOLENOID VALVE 827 | BACKWARD SOLENOID VALVE 818 |
|---|---|---|---|---|---|---|---|---|
| FORWARD | 1ST GEAR | | ○ | | ○ | | | |
| | 2ND GEAR | | ○ | | | | ○ | |
| | 3RD GEAR | | ○ | ○ | | | | |
| | 4TH GEAR | | ○ | | | ○ | | |
| | 5TH GEAR | | | | ○ | | | |
| | 6TH GEAR | | | | | | ○ | |
| | 7TH GEAR | | | ○ | | | | |
| | 8TH GEAR | | | | | ○ | | |
| BACKWARD | 1ST GEAR | | ○ | | ○ | | | ○ |
| | 2ND GEAR | | ○ | | | | ○ | ○ |
| | 3RD GEAR | | ○ | ○ | | | | ○ |
| | 4TH GEAR | | ○ | | | ○ | | ○ |
| | 5TH GEAR | | | | ○ | | | ○ |
| | 6TH GEAR | | | | | | ○ | ○ |
| | 7TH GEAR | | | ○ | | | | ○ |
| | 8TH GEAR | | | | | ○ | | ○ |
| NEUTRAL (PARKING) | | ○ | | | | | | |

ELECTRONICALLY CONTROLLED AUTOMATIC TRANSMISSION FOR VEHICLES

BACKGROUND OF THE INVENTION (1) Field of the Invention

The present invention relates to an electronically controlled automatic transmission for vehicles such as, for example, vehicles having a multi-stage automatic transmission, dump cars, trailer tractors motor graders, automobiles and the like.

Further, the present invention relates to an electronically controlled automatic transmission for vehicles in which an electronic control unit controls supply and discharge of pressurized oil on the basis of signals from a shift lever and running state detecting means to attain a desired speed change or transmission stage.

(2) Description of the Prior Art

An example of a conventional transmission for vehicles is schematically illustrated in FIG. 23. The transmission includes a multi-stage multi-plate clutch and gear. Thus, an operator moves a shift lever to a speed-stage in accordance with a speed manually to switch a hydraulic valve through a rod, wire or the like and selects a speed change or transmission stage to make operation running.

Another example of a conventional automatic transmission for vehicles is schematically illustrated in FIG. 24. In the transmission, an operator moves a shift lever into a unidirectional shift path to attain automatic speed change operation or transmission operation.

The conventional automatic transmission for vehicles illustrated in FIG. 24 has problems as follows:

(1) The conventional automatic transmission of FIG. 24 includes the shift lever moved in only one direction. In this shift lever, when a transmission having a number of speed change stages or transmission stages is automatically changed, for example when automatic speed change operation or transmission operation for eight stages is attained, it is necessary to provide many positions such as P (parking), N (neutral), D (automatic speed change OF automatic transmission), 8, 7, 6, 5, 4, 3, 2 and 1 in order to be able to select all speed stages manually by the operator and automatically. Accordingly, there is a problem that large space is occupied practically. In addition, operation is difficult and operation error tends to occur.

(2) In an automobile having an automatic transmission, normally, manual speed change operation or manual transmission operation is impossible at a high stage, and the automobile is used with high engine rotation during high-speed operation at D (automatic transmission) position in order to produce drive force. Accordingly, when a running speed is increased due to variation of a running resistance or slope, a shift-up operation is made unintentionally and lack of drive force occurs disadvantageously. Accordingly, manual transmission at a high-speed stage is desirable.

(3) When a multi-stage transmission operation, for example 8-stage transmission operation is attained in a vehicle having only manual transmission, 8 or more transmission positions are required. Accordingly, there is a problem that shift error by the operator occurs and transmission operation is troublesome.

A transmission mounted in a construction and civil engineering machinery such as a motor grader, a self-running scraper (motor scraper), a bulldozer and a wheel-type tractor shovel (wheel loader) or an industrial vehicle such as a forklift truck and a straddle carrier is required to cover a speed change area or transmission area from a very low speed area for original work to a normal running speed for running on a general road. Accordingly, as shown in FIG. 23, 6 to 8 transmission stages for both of forward and backward running are provided in general.

As described above, the transmission mounted in the construction and civil engineering machinery and the industrial vehicle includes very many transmission stages. Accordingly, in order to make small its structure and facilitate its transmission operation, the transmission adopts a direct power shift transmission (hereinafter referred to as a DSP) disclosed in Japanese Provisional Publication (Kokai) No. 62-255621 (1987). The DSP includes friction engagement elements such as clutch and brake assembled to rotating elements constituting a plurality of planetary gears in which an input axial end of the rotating elements is directly coupled with an output axis of an engine without a fluid coupling such as a torque converter. Thus, the DSP electrically controls selective supply and discharge of pressurized oil with respect to the friction engagement elements to thereby couple any rotating element of the planetary gears to the input axis of the transmission or fix the rotating element to a casing of the transmission, so that a transmission ratio is switched in accordance with a position of the transmission stage of the shift lever selected on the basis of operation of a driver.

The construction and civil engineering machinery and the industrial vehicle are to make special work and accordingly very many operation levers and switches are disposed around a driver's seat in addition to a steering handle and a shift lever. For example, a motor grader includes about ten operation levers disposed in a steering console provided with a steering handle to operate a blade and a scarifier. Further, a shift lever, many switches for lighting, various meters are disposed adjacent to the driver's seat.

Accordingly, operation of the operation levers, switches and the shift lever are very troublesome. Smooth operation of the construction and civil engineering machinery and the industrial vehicle requires very high skill.

(4) However, when various circumstances such as a great age of skilled operators and reduction of the absolute number of skilled operators are considered, it is desirable that the operability is made as simple as possible and the construction and civil engineering machinery and the industrial vehicle (hereinafter referred as vehicles) can be operated relatively easily by even other person than the skilled operator.

SUMMARY OF THE INVENTION

A first aspect of the present invention is to be provided in view of the above problems (1) to (3). An object is to provide an electronically controlled automatic transmission for vehicles capable of attaining easy operation, maintenance of an optimum speed stage and improved operation efficiency of vehicles.

In order to achieve the above object, according to the first aspect of the present invention, in the electronically controlled automatic transmission for vehicles in which a shift lever is moved in a longitudinal shift path parallel to a moving direction of the vehicle and the transmission is automatically switched to a transmission pattern indicated by a stop position of the shift lever, a transverse shift path is disposed substantially crosswise with respect to the longitudinal shift path and the shift lever is moved from the longitudinal shift path to the transverse shift path, so that a gear stage of the transmission can be switched to a manual speed change stage or manual transmission stage.

Further, according to the first aspect of the present invention, a push button switch is provided in the shift lever and the push button switch is depressed during the running in which the shift lever is at an automatic transmission position in the longitudinal shift path, so that a gear stage during the running is fixed to be switched to the manual transmission while the push button switch is depressed once more to thereby be switched to the automatic transmission.

Furthermore, according to the first aspect of the present invention, when the shift lever provided in the push button switch is at the automatic transmission position in the longitudinal shift path and the gear stage during running is fixed by the push button switch, the shift lever can be moved from the automatic transmission position into the longitudinal shift path to thereby release the fixed gear stage.

In addition, according to the first aspect of the present invention, the manual transmission can be made to a high speed stage by the stages corresponding to the number of times of movement of the shift lever from the automatic transmission position in the longitudinal shift path into the transverse shift path and on the contrary the manual transmission can be made to a low speed stage by the stages corresponding to the number of times of movement of the shift lever from the transverse shift path to the automatic transmission path in the longitudinal shift path.

Further, according to the first aspect of the present invention, a plurality of position detectors for detecting each of transmission positions of the shift lever in the shift path are connected to the automatic transmission through the electronic control apparatus.

The electronically controlled automatic transmission for vehicles according to the first aspect of the present invention configured above can attain the following effects: (1) By moving the shift lever in the longitudinal shift path, various gear states are selected. Further, at the automatic transmission position D, the gears are automatically changed from starting to a maximum gear stage. Thus, the operator can run the automobile without operation of the shift lever to thereby increase the safety and facilitate driving. (2) When the operator depresses the push button switch provided in the shift lever during the automatic transmission running, the gear stage during the running is fixed. Accordingly, when a burden is varied in running on a slope or in operation, inadvertent automatic shift is prevented and an optimum speed stage is maintained. (3) When the gear stage is fixed in the automatic transmission position D and the shift lever is moved into the transverse shift path, the operator can varies the stages while varying one stage a time with the operator's will. That is, the operator can change the transmission from the automatic transmission state to the manual transmission state. Further, the operator can switch the transmission state to the automatic transmission state or the manual transmission state in accordance with various running states and operation states to thereby improve the operation efficiency of the vehicle.

According to a second aspect of the present invention, an object of the present invention is to provide a low-cost transmission capable of automatically selecting an optimum transmission stage in accordance with the operation state of the vehicle in view of the opinion described in (4).

In order to achieve the above object, the electronically controlled automatic transmission for vehicles according to the second aspect of the present invention comprises a shift lever set to a manual transmission position selected by a driver's operation and capable of being switched to a desired transmission position and an automatic transmission position in which a transmission stake can be varied automatically in accordance with a running state of the vehicle, running state detecting means for detecting a running state of the vehicle, and an electronic control unit for controlling selective supply and discharge of pressurized oil on the basis of signals from the running state detecting means and the shift lever and capable of attaining a predetermined transmission stage.

The running state detecting means may adopt a speed sensor for detecting a running speed of the vehicle or an accelerator opening sensor for detecting an amount of movement of an accelerator pedal.

The second aspect of the present invention includes the above structure and thus can attain the followings. When the shift lever is selected to the automatic transmission position by the driver's operation, the electronic control unit can select an optimum transmission stage on the basis of the running state of the vehicle such as the running speed of the vehicle and an amount of movement of the accelerator pedal and control selective supply and discharge of pressurized oil in accordance with the transmission stage to thereby attain a desired transmission stage.

Further, when the shift lever is selected to the manual transmission position, the electronic control unit can control selective supply and discharge of pressurized oil so that the transmission stage designated by the driver can be attained at the manual transmission position to thereby attain the desired transmission stage.

As described above, according to the electronically controlled automatic transmission of the second aspect of the present invention, the transmission can be realized in which the manual transmission and the automatic transmission can be selected basically only by modification of the software without many modifications of the transmission. Troublesomeness due to the transmission operation of the driver in the construction and civil machinery and the industrial vehicle can be reduced greatly.

BRIEF DESCRIPTION OF THE DRAWINGS

FIG. 13 is an operation element diagram illustrating a relation of engagement states of friction engagement elements and transmission stages in the embodiment;

FIG. 16 is an operation element diagram illustrating a relation of engagement states of solenoid controlled valves for transmission and transmission stages in the embodiment;

DETAILED DESCRIPTION OF THE PREFERRED EMBODIMENTS

First Embodiment

Figure 1:
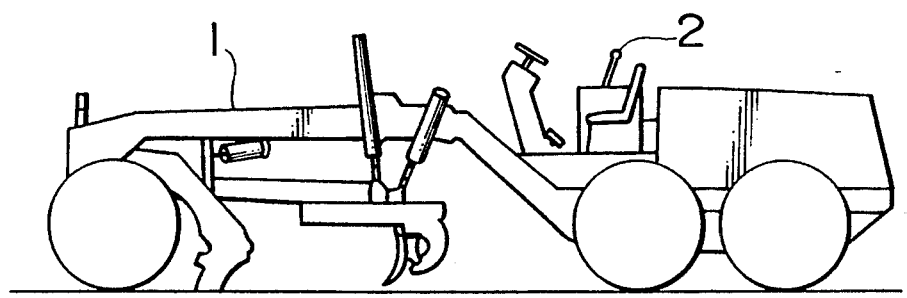
FIG. 1 is a side view of a motor grader to which an electronically controlled automatic transmission for vehicles according to a first aspect of the present invention is applied.
Figure 2:
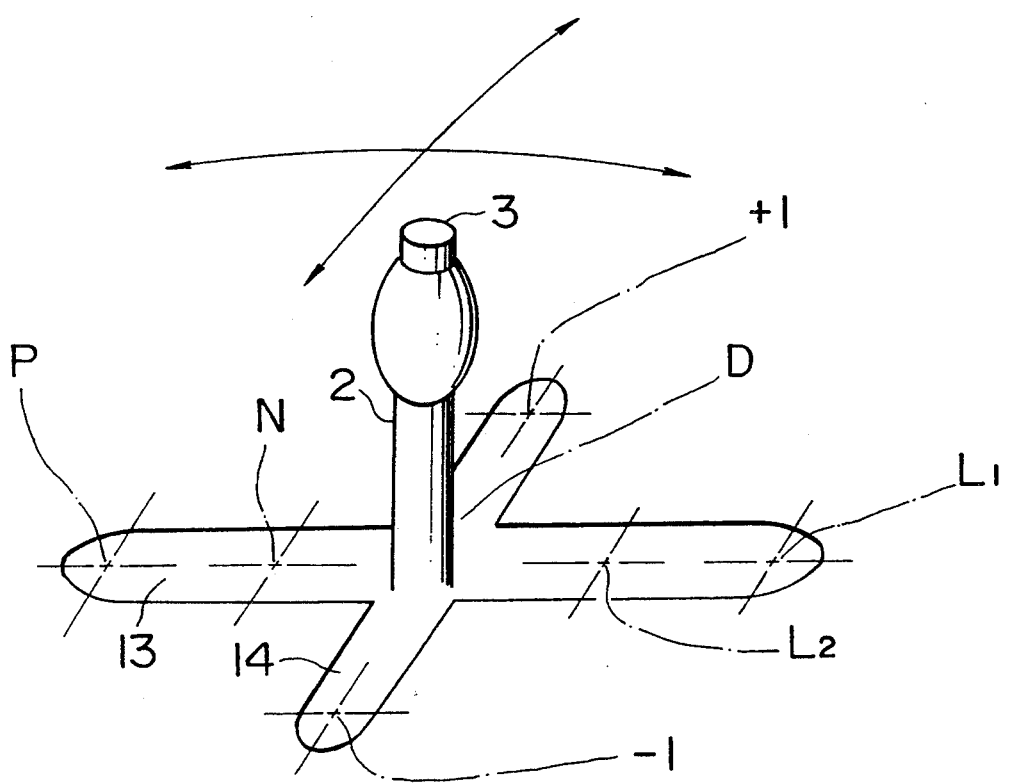
FIG. 2 is a perspective view schematically illustrating an embodiment of a shift device of the electronically controlled automatic transmission of the first aspect of the present invention.
Figure 3:
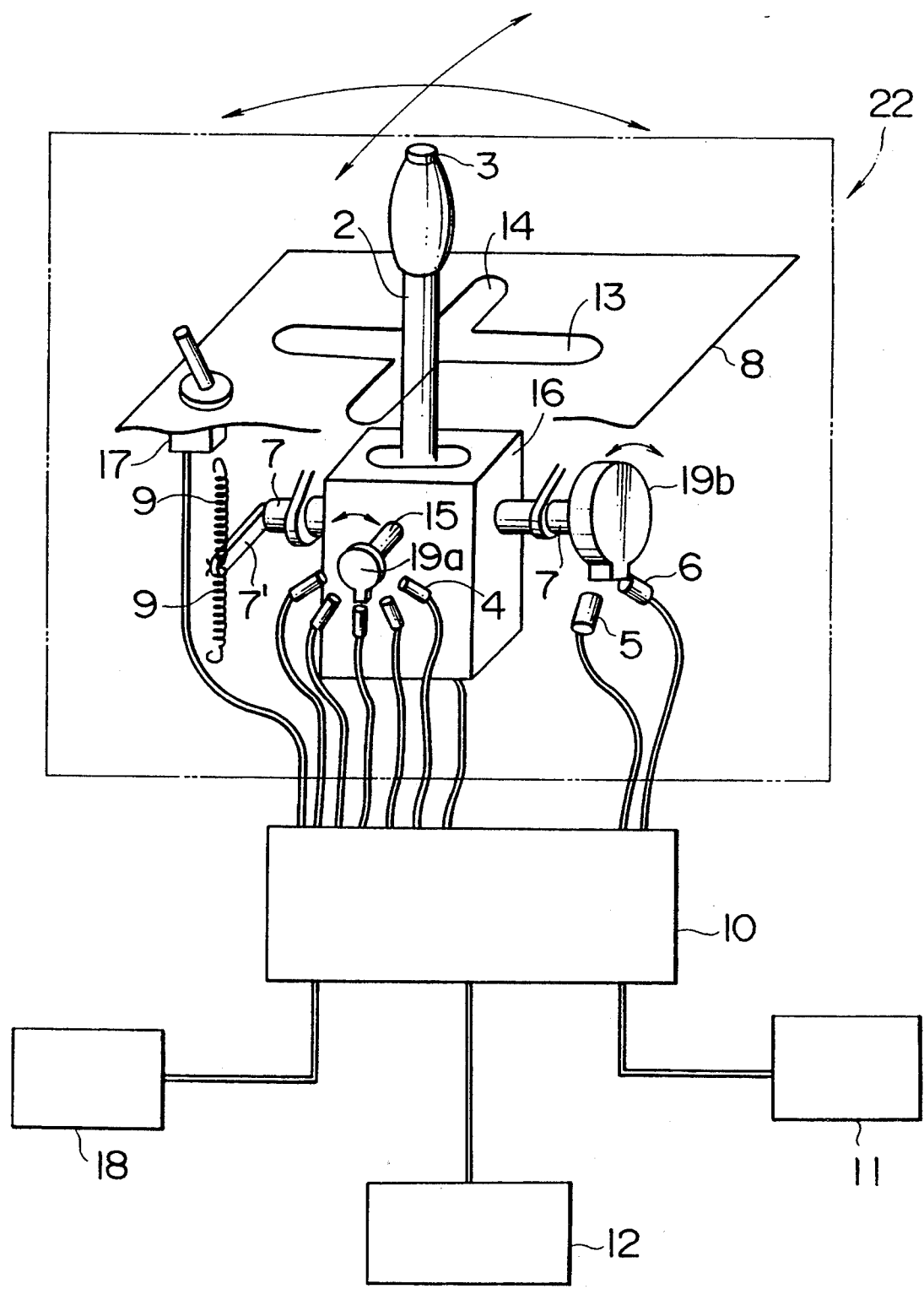
FIG. 3 is a system diagram illustrating the shift device, an electronic control unit and the automatic transmission.
Figure 4:
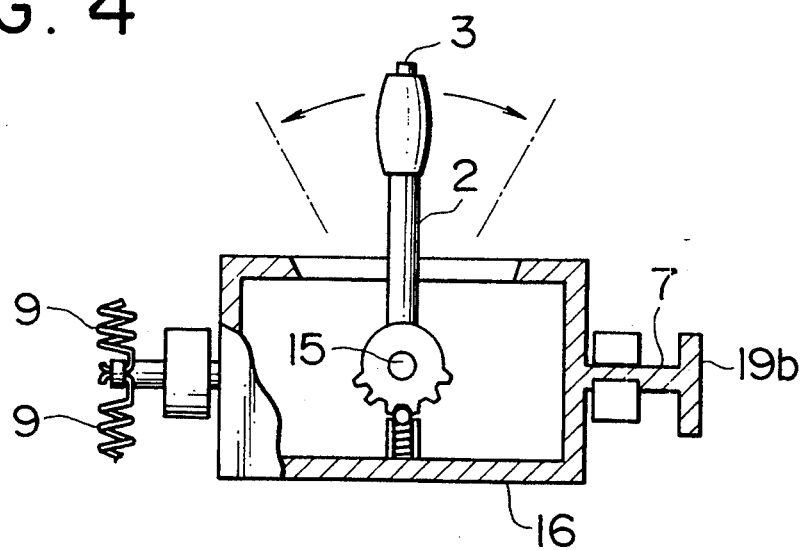
FIG. 4 is a longitudinal sectional view showing one side of the shift device.
Figure 5:
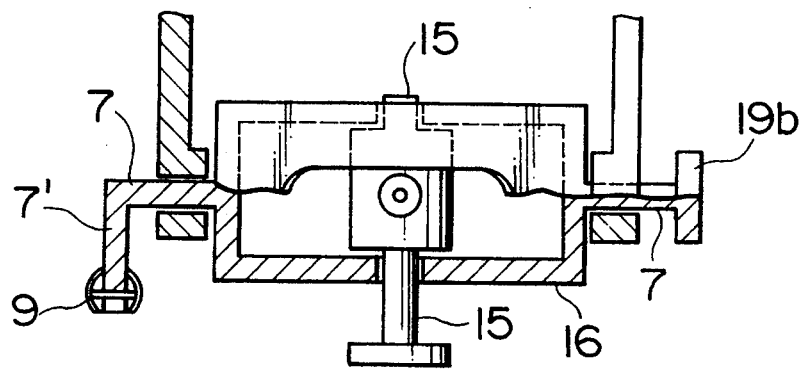
FIG. 5 is a cross-sectional plan view of the shift device.
Figure 6:
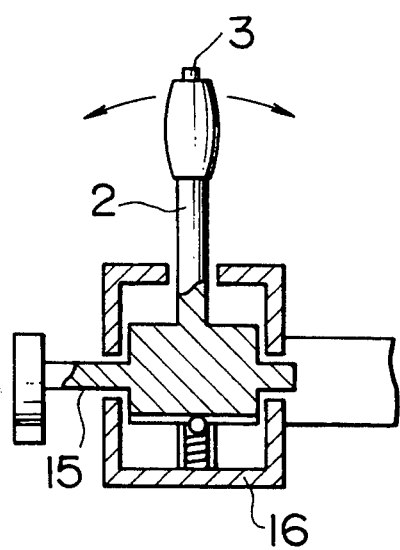
FIG. 6 is a longitudinal sectional view showing the other side of the shift device.

An electronically controlled automatic transmission for vehicles and its shift device according to a first aspect of the present invention are now described with reference to a first embodiment illustrated in FIGS. 1 to 7. Numeral 1 in FIG. 1 denotes a motor grader, Numeral 2 in FIGS. 1 and 2 denote a shift lever, and numeral 3 denotes a push button switch disposed on the top of the shift lever 2. In FIG. 3, numeral 8 denotes a gate plate, numeral 13 denotes a longitudinal shift path formed in the gate plate 8 in parallel to the moving direction of a vehicle and numeral 14 denotes a transverse shift path formed substantially crosswise with respect to the longitudinal shift path 13.

Numeral 16 of FIG. 3 denotes a shift lever unit. Numeral 15 of FIGS. 3 to 5 denotes a longitudinal rotational axis mounted rotatably to the shift lever unit 16. A lower end of the shift lever 2 is mounted to the longitudinal rotational axis 15. Numeral 7 of FIGS. 3 to 5 denotes a pair of transverse rotational axes mounted to the both sides of the shift lever unit 16. The shift lever unit 16 is supported rotatably by means of the transverse rotational axes 7.

Numeral 19a denotes a sensor plate with a protrusion mounted to an end portion of the longitudinal rotational axis 15 and numeral 19b denotes a sensor plate with a protrusion mounted to an external end portion of one of the transverse rotational axis 7. Numeral 4 denotes a position switch group disposed in the vicinity of the sensor plate 19a, numeral 5 denotes a shift up sensor disposed in the vicinity of the sensor plate 19b, and numeral 6 denotes a shift down sensor disposed in the vicinity of the sensor plate 19b.

Numeral 7' denotes an arm mounted to an external end portion of the other transverse rotational axis 7 and numeral 9 denotes a spring attached between an end portion of the arm 7' and a shift device body 22. The shift lever 2 is adapted to be always supported to a neutral position with respect to the transverse movement direction by means of the spring 9.

Numeral 17 denotes a change-over switch mounted on the gate plate 8 and numeral 10 denotes an electronic control unit. The change-over switch 17, the position switch group 4, the shift up sensor 5 and the shift down sensor 6 are connected to the electronic control unit 10.

Numeral 11 denotes a display monitor, numeral 12 denotes an automatic transmission and numeral 18 denotes various sensors. The display monitor 11, the automatic transmission 12 and the various sensors 18 are also connected to the electronic control unit 10. Numeral 20 of FIG. 7 denotes a solenoid controlled valve of the automatic transmission 12 and numeral 21 denotes a transmission of the automatic transmission 12.

Figure 7:
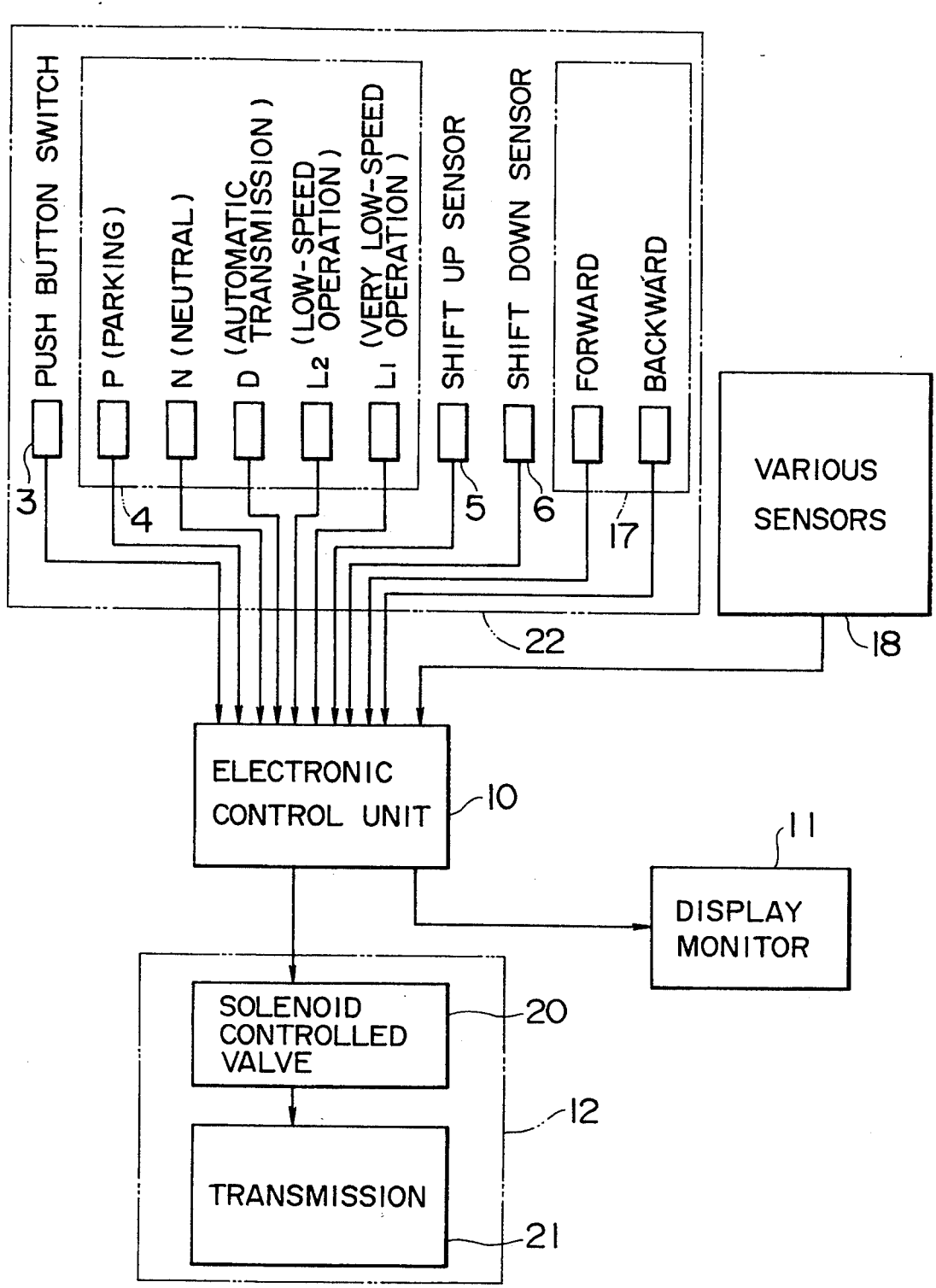
FIG. 7 schematically illustrates a flow of control in the shift device, the electronic control unit and the automatic transmission.

FIG. 7 schematically illustrates a control system from the shift device 22 to the transmission 21. When input signals supplied to the electronic control unit 10 in FIG. 7 are described in conjunction with FIG. 2, the signals are classified as follows:

(1) Signals produced by the position switch group 4 detecting a position of the shift lever 2 moved at a five-stage position (by way of example, P (parking), N (neutral), D (automatic transmission), $L_2$ (low-speed operation) and $L_1$ (high-speed operation)) positioned in the longitudinal shift path 13, (2) A signals produced by the push button switch 3 when the operator switches the gear stage to a fixed or automatic transmission while the vehicle is running at the position D (automatic transmission), (3) Signals produced by the shift up sensor 5 and the shift down sensor 5 detecting transverse movement (shift up or shift down) of the shift lever 2 in the transverse shift path 14, (4) Signals produced by the change-over switch 17 for switching the forward movement or the backward movement, and (5) Signals produced by various sensors (a vehicle speed sensor, an engine rotational number sensor, an accelerator opening sensor and the like).

These signals are subjected to the arithmetic operation in accordance with definitions established previously in the electronic control unit 10. The results are supplied to the solenoid controlled valve 20 in the automatic transmission 12 to control the valve 20 so that the transmission 21 is controlled to change the speed.

Further, signals representative of states of the automatic transmission 12 at each time are also supplied to the display monitor 11 and are displayed to inform the operator of the states.

Operation of the electronically controlled automatic transmission for vehicles shown in FIGS. 1 to 7 is now described in detail. When the shift lever 2 is moved longitudinally along the longitudinal shift path 13, the movement of the shift lever is detected by the position switch group 4. Thus, the electronic control unit 10 recognizes a position of the shift lever 2, so that automatic transmission is made as determined in accordance with the transmission position.

When the shift lever 2 is at the automatic transmission position D, the automatic transmission 12 is controlled as previously determined in accordance with conditions (the speed of the vehicle, the rotation number of the engine, the opening of the accelerator and the like) of the various sensors to perform the automatic transmission operation.

When the shift lever 2 is at the parking position P, the gear of the automatic transmission 12 is released and a parking brake of the vehicle is operated. As another example, when the backward movement position R is used for the parking position P, the automatic transmission operation for the backward movement is attained.

When the shift lever 2 is at the neutral position N, the parking brake is released and the transmission is in the neutral state. When the shift lever 2 is moved from this position to the automatic transmission position D and the rotation of the engine is increased to a predetermined rotation number, the vehicle begins to run. Thus, the transmission 21 makes the automatic transmission operation in accordance with a predetermined definition on the basis of the conditions of the speed of the vehicle, the rotation number of the engine, the opening of the accelerator and the like.

When the operator depresses the push button switch 3 provided in the shift lever 2 while the vehicle is running at the automatic transmission position D, the gear stage in this state is fixed. When the shift lever 2 is transversely moved along the transverse shift path 14 in this state, this movement is detected by the shift up sensor 5 or the shift down sensor 6. When the shift lever 2 is moved to the shift u-p side, the automatic transmission 12 is controlled by the electronic control unit 10 by the number of stages corresponding to the number of times thereof to make the shift up. On the contrary, when the shift lever 2 is moved to the shift down side, the automatic transmission 12 is controlled by the electronic control unit 10 by the number of stages corresponding to the number of times thereof to make the shift down. Thus, the transmission attains manual transmission one stage by one stage.

The change-over switch 17 i s connected to the electronic control unit 10 to perform the switching of forward movement and backward movement. In this case, the shift device acts in the same manner whether the forward movement or the backward movement except that the moving direction is changed. As another embodiment, when the change-over switch 17 is set in the state of the parking brake and the parking position P is used for the backward movement position R, the transmission becomes to the state of automatic transmission for the backward movement and the transmission functions only by the forward movement in the position except the neutral position N.

When the shift lever 2 is at the low-speed operation position $L_2$, the transmission is set to a predetermined gear stage, for example, a low gear stage such as the second gear.

When the shift lever 2 is at the very low-speed operation position $L_1$, its gear stage is set to a lower gear stage so that the transmission can produce driving force suitable for the very low-speed operation or engine brake.

From the foregoing description, the electronically controlled automatic transmission for vehicles according to the first aspect of the present invention selects various gear states in response to the movement of the shift lever 2 in the longitudinal shift path 13. Since the gears are automatically changed from starting to a maximum gear stage at the automatic transmission position D, the operator can run the automobile without operation of the shift lever 2 to thereby increase the stability and facilitate driving.

When the operator depresses the push button switch 3 provided in the shift lever 2 during the automatic transmission running, the gear stage during the running can be fixed. Accordingly, when the work load on the vehicle engine changes, for example when the vehicle encounters a slope, a change in inclination or a change in load, inadvertent automatic shift is prevented and an optimum speed stage is maintained, When the gear stage is fixed at the automatic transmission position D and the shift lever 2 is moved into the transverse shift path 14, the operator can vary the stages while varying one stage a time at the operator's will. That is, the manual transmission can be selected regardless of the automatic transmission state. Accordingly, the operator can switch the transmission state to the automatic transmission state or the manual transmission state in accordance with various running states and operation states to thereby improve the operation efficiency of the operation vehicle.

Second Embodiment

Figure 8:
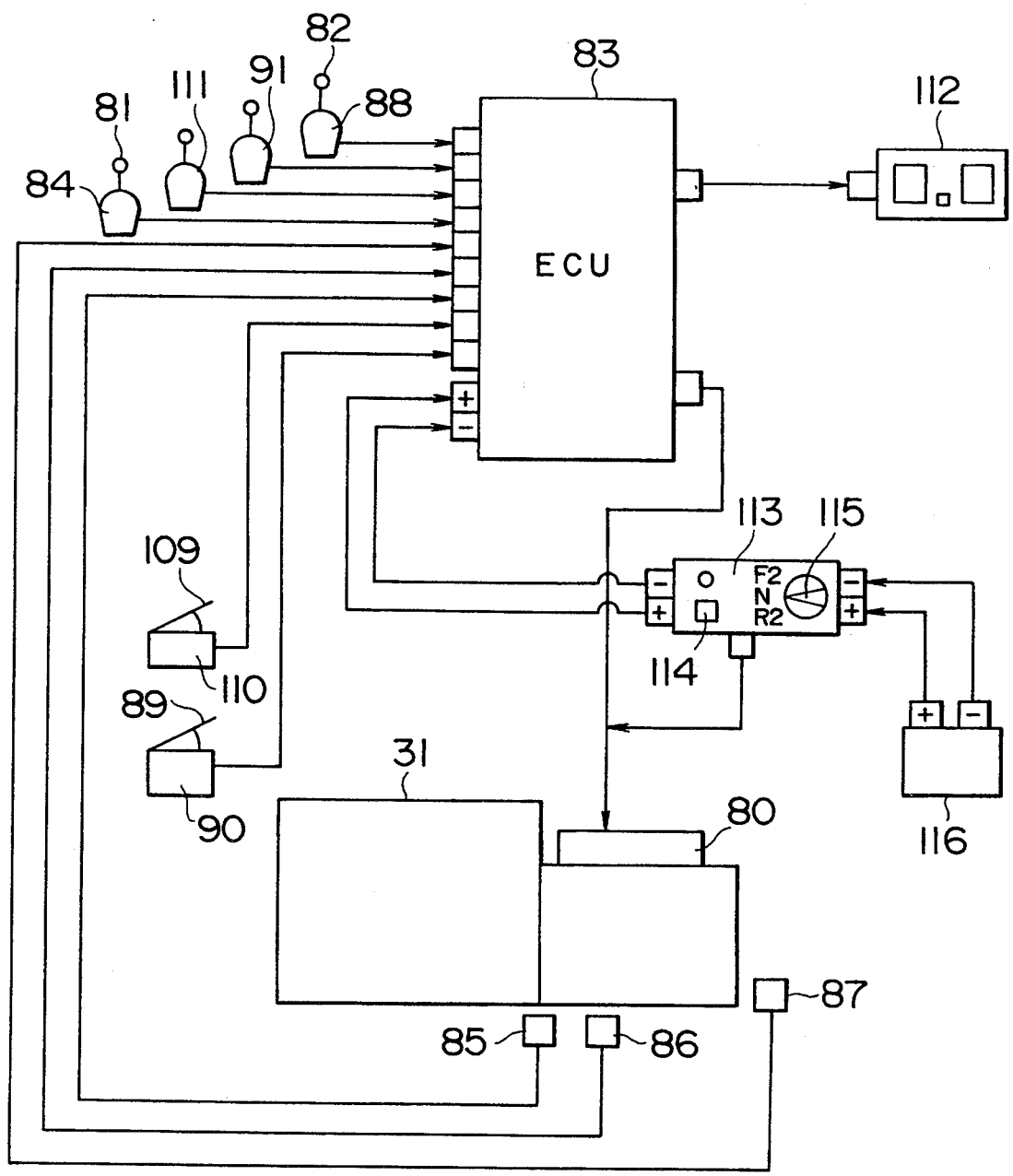
FIG. 8 is a control block diagram of an embodiment of an electronically controlled automatic transmission for vehicles according to a second aspect of the present invention which is mounted in a motor grader with eight stages for forward and backward.
Figure 9:
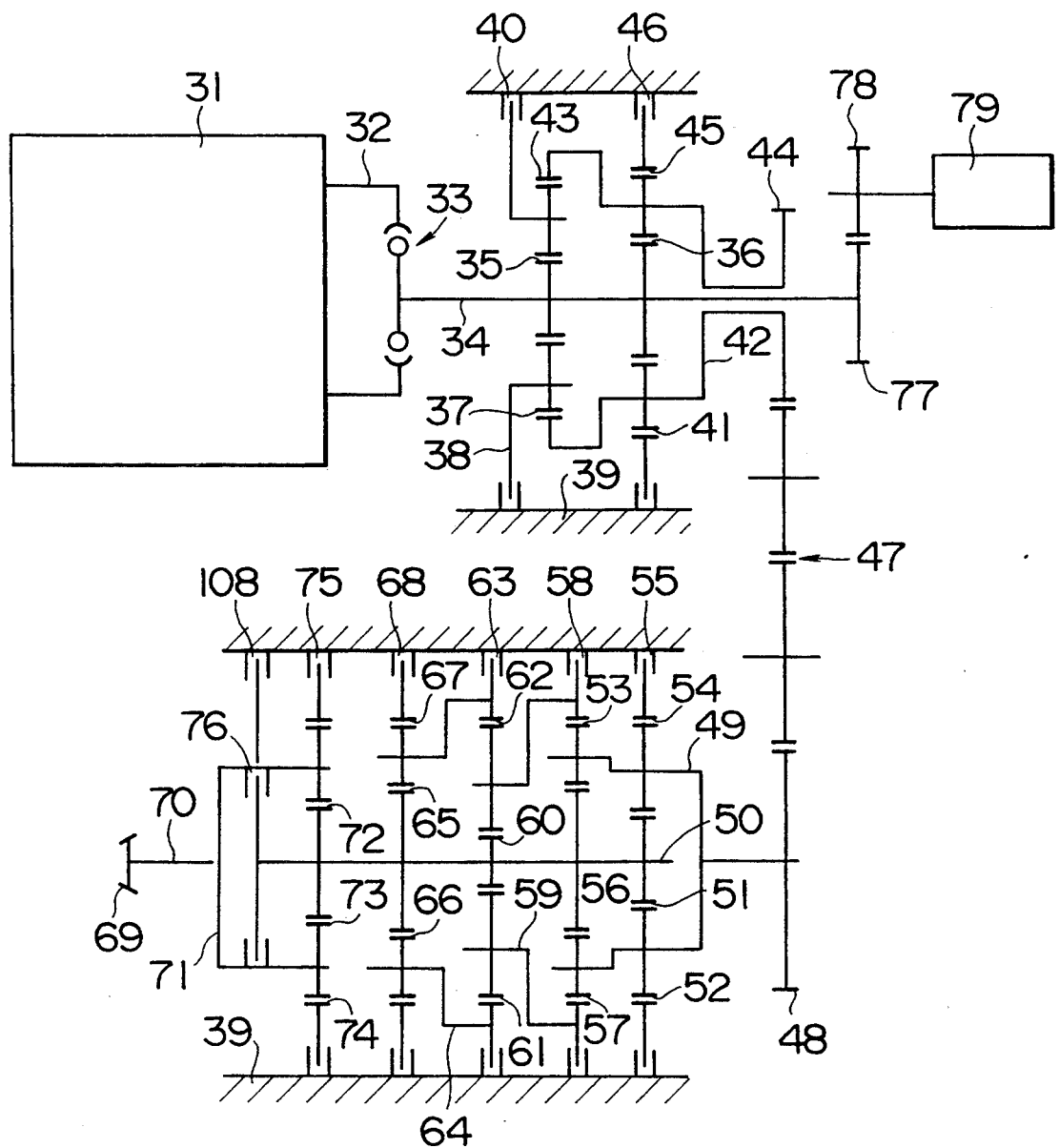
FIG. 9 is a schematic diagram illustrating a drive system in the embodiment.

A second embodiment of the electronically control led automatic transmission according to the second aspect of the present invent/on is described below. The transmission is assembled into a motor grader and has eight gear stages for both of the forward and backward movement. FIG. 8 schematically illustrates a control system and FIG. 9 schematically illustrates a driving system. As illustrated in FIGS. 8 and 9, a transmission input axis 34 is coupled with a crank shaft 32 of an engine 31 through a damper 33. A sun gear 35 for backward movement and a sun gear 36 for forward movement are integrally disposed to the transmission input axis 34. The backward movement sun gear 35 is meshed with a planet gear 37 for backward movement. Thus, a clutch 40 for backward movement is mounted between a planet carrier 38 for backward movement of the backward movement planet gear 37 and a transmission case 39. The forward movement sun gear 36 is meshed with a planet gear 41 for forward movement. An internal gear 43 for backward movement meshed with the backward movement planet gear 37 and a driving gear 44 are integrally provided in a planet carrier 42 of the forward movement planet gear 41. Further, a clutch 46 for forward movement is mounted between an internal gear 45 for forward movement meshed with the forward movement planet gear 41 and the transmission case 39.

An input gear 48 is meshed with the driving gear 44 through a transmission gear group 47. A third planet gear 53 and a fourth planet gear 52 meshed with a fourth sun gear 51 mounted to an intermediate axis 50 are rotatably mounted to a fourth planet carrier 49 mounted integrally to the input gear 48. Further, a brake 55 for the fourth and eighth gear is mounted between a fourth internal gear 54 meshed with the fourth planet gear 52 and the transmission case 39. The third planet gear 53 is meshed with a third sun gear 56 mounted to the intermediate axis 50 adjacent to the fourth sun gear 51 and a third internal gear 57 surrounding the third planet gear 53. A brake 58 for the third and seventh gear is mounted between the third internal gear 57 and the transmission case 39. A second planet gear 61 meshed with a second sun gear 60 mounted to the intermediate axis adjacent to the third sun gear 56 is rotatably mounted to a second planet carrier 59 to which the third internal gear 57 is integrally formed. A brake 63 for the second and sixth gear is mounted between a second internal gear 62 meshed with the second planet gear 61 and which surrounds the second planet gear 51 and the transmission case 39. Further, a first planet gear 66 meshed with a first sun gear 65 mounted to the intermediate axis 50 adjacent to the second sun gear 60 is rotatably mounted to a first planet carrier 64 to which the second internal gear 62 is formed integrally. A brake 68 for the first and fifth gear is mounted between a first internal gear 67 meshed with the first planet gear 66 and which surrounds the first planet gear 66 and the transmission case 39.

On the other hand, a high-low switching planet carrier 71 is integrally mounted to an output transmission shaft 70 to which an output bevel gear 69 is integrally formed. A high-low switching planet gear 73 meshed with a high-low switching sun gear 72 mounted to the intermediate axis 50 adjacent to the first sun gear 65 is rotatably mounted to the high-low switching planet carrier 71. Further, a brake 75 for low-speed gear is mounted between the transmission case 39 and a high-low switching internal gear 74 meshed with the high-low switching internal gear 73 and which surrounds the high-low switching internal gear 73. A brake 76 for high-speed gear is mounted between the intermediate axis 50 and the high-low switching planet carrier 71.

Each of the clutches 40 and 46 and the brakes 55, 58, 63, 68, 75 and 76 which are friction engagement elements is constituted by a hydraulic apparatus including an engagement piston device and a servo device. The engagement state thereof is switched through a hydraulic control device 80 described later by means of pressurized oil supplied from a hydraulic pump 79 including a transmission gear 78 meshed with a pump driving gear 77 disposed at an end of the input transmission axis 34. In this case, the engagement state of the clutches 40 and 45 and the brakes 55, 58, 63, 68, 75 and 76 is switched by a command from the electronic control unit 83 which controls the operation state of the engine 31, on the basis of the selection position of a forward and backward switching lever 81 disposed in a cabin not shown in the embodiment, the position of the shift lever 82 and the operation state of the vehicle. Thus, a desired transmission stage is attained.

More particularly, when the transmission operation is made, a pressure of the pressurized oil supplied to the backward clutch 40 or the forward clutch 46 is reduced temporarily. Consequently, transmission of driving force from the crank shaft 32 of the engine 31 to the driving gear 44 is cut off. Then, engagement operation and release operation of a desired brake of the brakes 55, 58, 63, 68, 75 and 76 are made. Thus, after a desired transmission stage is attained, supply pressure of oil to the backward clutch 40 or the forward clutch 46 is increased again so that rotation of the crank shaft 32 of the engine 31 is adapted to be transmitted to the output transmission shaft 70 gradually.

Accordingly, a detection signal from the engine rotational speed sensor 85 for detecting a rotational speed of the crank shaft 32 of the engine 31, a detection signal from a transfer rotation speed sensor 86 for detecting a rotational speed of the driving gear 44, a detection signal from the speed sensor 87 for detecting a rotational speed of the output transmission shaft 70 corresponding to a running speed of the vehicle, a detection signal from a shift position sensor 88 for detecting a position of the shift lever 82 and a detection signal from an accelerator opening sensor 90 for detecting an opening of an accelerator pedal 89 are supplied to the electronic control unit (hereinafter referred to as ECU) in addition to the detection signal from a forward and backward change-over switch 84 for detecting a position of the forward and backward switching lever 81.

Figure 10:
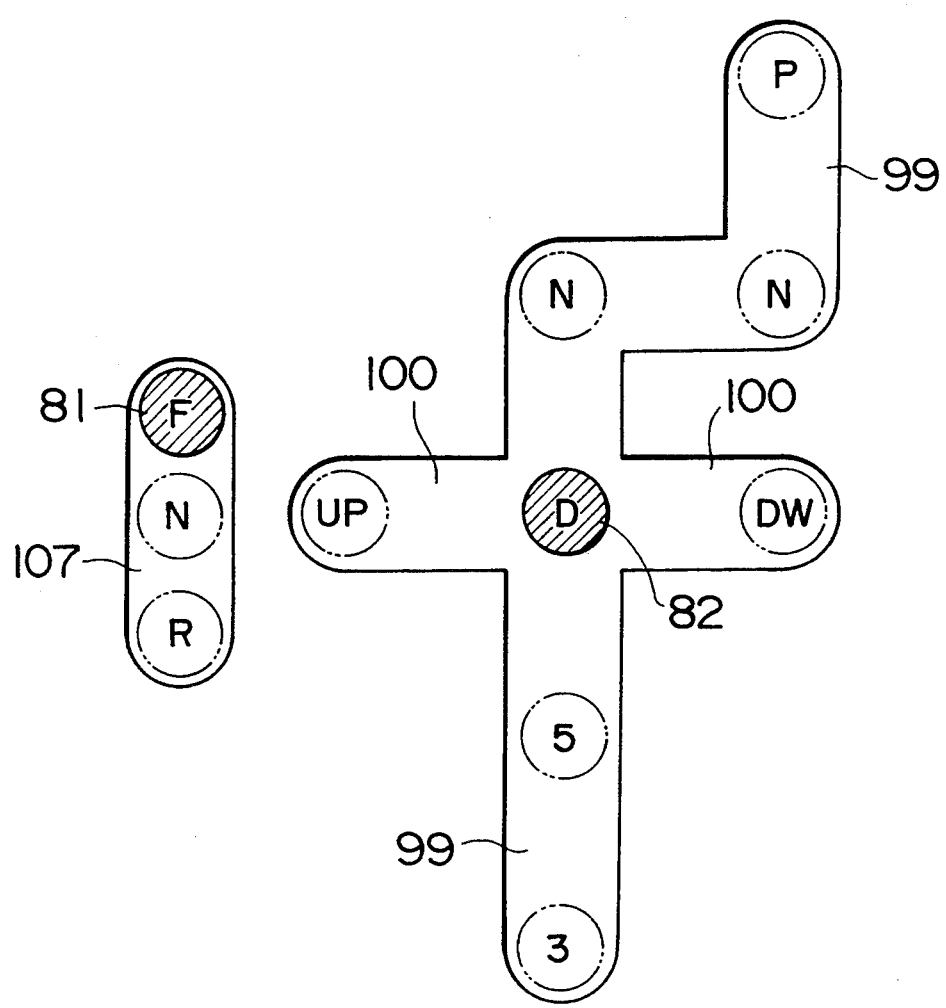
FIG. 10 is a schematic diagram illustrating a selection pattern of a shift lever in the embodiment.

FIG. 10 illustrates a selection pattern of the shift lever 82 in the embodiment. As illustrated in FIG. 10, in addition to P (parking), N (neutral), D (automatic transmission for first speed gear to eighth speed gear), 5 (automatic transmission for first speed gear to sixth speed gear) and 3 (automatic transmission for first speed gear to fourth speed gear) as the selectable transmission position of the shift lever 82, two transmission positions for the up-shift "UP" and the down-shift "DW" by manual operation are provided on the both side of the D range.

Further, a transmission mode change-over switch 91 for switching the automatic transmission mode and the manual transmission mode is mounted on the upper end of the shift lever 82. The transmission mode change-over switch 91 is connected to the ECU 83. The transmission mode is switched by pushing the transmission mode change-over switch 91 once and the original transmission mode is selected by pushing the switch twice. Thus, when the transmission mode change-over switch 91 is operated to select the manual transmission mode, the up-shift and the down-shift are switched freely with respect to the current transmission stage by shifting the transmission lever 82 to the UP position or the DW position in the D range. However, when the transmission mode change-over switch 91 is operated to select the automatic transmission mode, the up-shift and the down-shift are not attained even if the transmission lever 82 is shifted to the UP position or the DW position, and the automatic transmission for the first to eighth speed gear of the D range is maintained.

Figure 11:
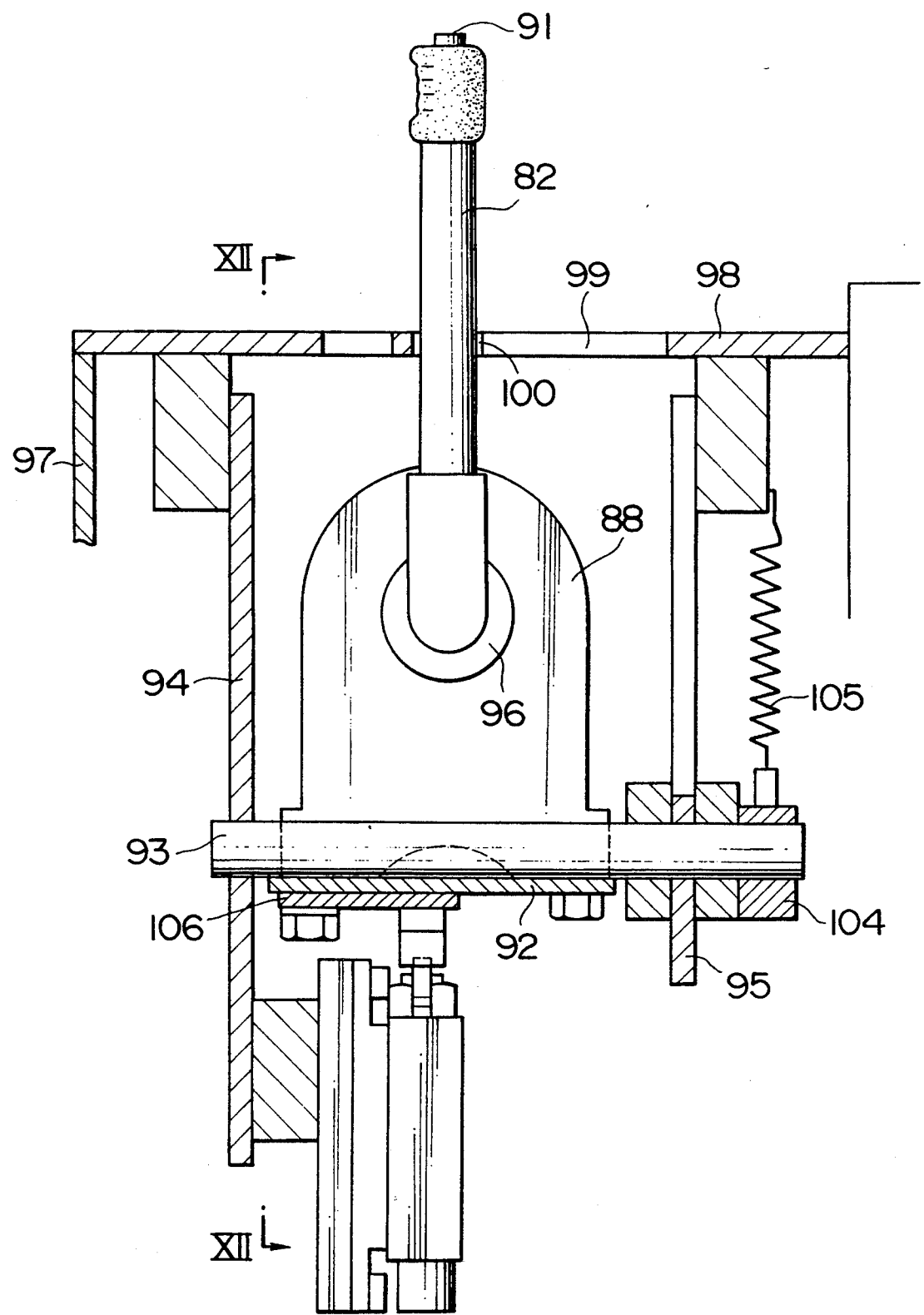
FIG. 11 is a sectional view schematically illustrating a structure of a portion of the shift lever of the embodiment.
Figure 12:
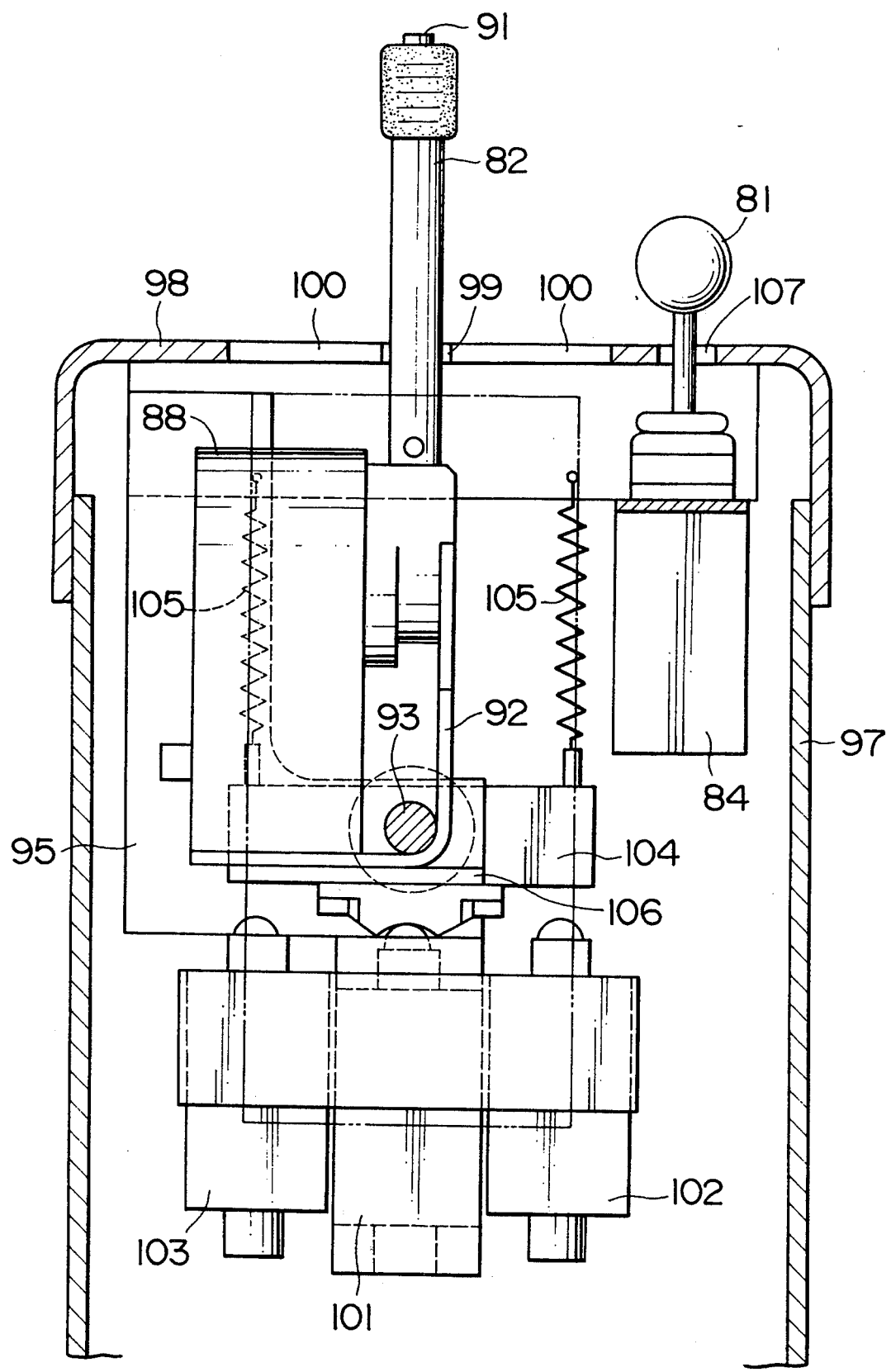
FIG. 12 is a sectional view taken along line XII—XII of FIG. 11.

FIG. 11 is a sectional view schematically illustrating a structure of the shift lever 82 in the embodiment and FIG. 12 is a sectional view taken along line XII—XII of FIG. 11. As illustrated in FIGS. 11 and 12, a manual transmission pivotal axis 93 is integrally joined to a sensor bracket 92 to which the shift position sensor 88 is mounted. Both ends of the manual transmission pivotal axis 93 are rotatably mounted to lower ends of a pair of axis supporting front and back brackets 94 and 95 disposed in a cabin not shown. When the shift lever 82 is positioned in the D range, the driver can swing the shift lever 82 right and heft with respect to the manual transmission pivotal axis 93 in accordance with the UP position and DW position.

A lower end of the shift lever 82 is integrally coupled to a rotary axis 96 of the shift position sensor 88 orthogonal to the manual transmission pivotal axis 93. The shift lever 82 can select five pivotal positions of P, N, D, 5 and 3 before and behind the rotary axis 96. Accordingly, an opening 99 formed by bending an intermediate portion connecting the N range and the D range at a right angle as shown in FIG. 10 is formed in an upper plate 98 of shift lever case 97 for guiding movement of the shift lever 82. An opening 100 corresponding to the UP position and the DW position is formed in the D range orthogonally thereto.

A reference position sensor 101 for detecting that the shift lever 82 is positioned at reference position of the shift lever 82 in the D range, that is, at a position in which the openings 99 and 100 are intersected with each other is fixedly mounted just below the manual transmission pivotal axis 93. Further, an up shift switch 102 and a down shift switch 103 for detecting the UP position and the DW position of the shift lever 82 in the D range, respectively, are fixedly mounted on both of right and left sides of the reference position sensor 101. Both ends of a spring supporting arm 104 integrally fixed to a rear end of the manual transmission axis 93 and extending right and left are coupled to an upper end of the axis supporting bracket 95 through a pair of right and left extension springs 105.

Accordingly, when the shift lever 82 is positioned at the D range and the driver does not exert his power to the shift lever 82, the shift lever 82 is always held at the reference position. When the driver operates the shift lever 82 to the UP position or the DW position, both of right and left ends of base plate 106 provided integrally to the sensor bracket 91 abuts against any of the up shift switch 102 or the down shift switch 103. Up shift signal OF down shift signal for one stage is supplied to the ECU 83 irrespective of operation of the transmission mode change-over switch 91 . The driver repeats this operation plural times, so that up shift signal and down shift signal for multi-stage can be produced freely.

In the embodiment, the forward and backward switching lever 81 in which a forward and backward change-over switch 84 is assembled is disposed at the side of the shift lever 82. Thus, an opening 107 for guiding forward and backward movement of the lever 81 is formed in the upper plate 97 of the shift lever case 96. When the driver selects any position of F (forward), N (neutral) and R (backward) as a position of the lever 81, the running direction of the vehicle is selected.

In this way, the driver operates the forward and backward switching lever 81 for switching forward and backward movement of the vehicle to thereby select the running direction of the vehicle. Thus, in this state, the driver can set the shift lever 82 to any of the D range, 5 range and 3 range to thereby switch to a predetermined forward stage or backward stage. Operational relation of the clutches 40 and 46 and the brakes 55, 58, 63, 68, 75 and 76 to each of the transmission stages is shown in FIG. 13. In FIG. 13, a mark of circle represents an engagement state by hydraulic operation.

In the embodiment, when the shift lever 82 is held in the P range so that the vehicle is set to the parking state, since mechanical braking of the driving system is made in interlocked relationship with the operation of the shift lever 82, a mechanical hydraulic brake 108 of which an engagement state is switched by means of an actuator not shown interlocked with the operation of the shift lever 82 is mounted between the high-low switching planet carrier 71 and the transmission case 39. The actuator for switching the engagement state of time mechanical hydraulic brake 108 is interlocked with the operation of the shift lever 82 independently of the hydraulic control unit 80.

Figure 14:
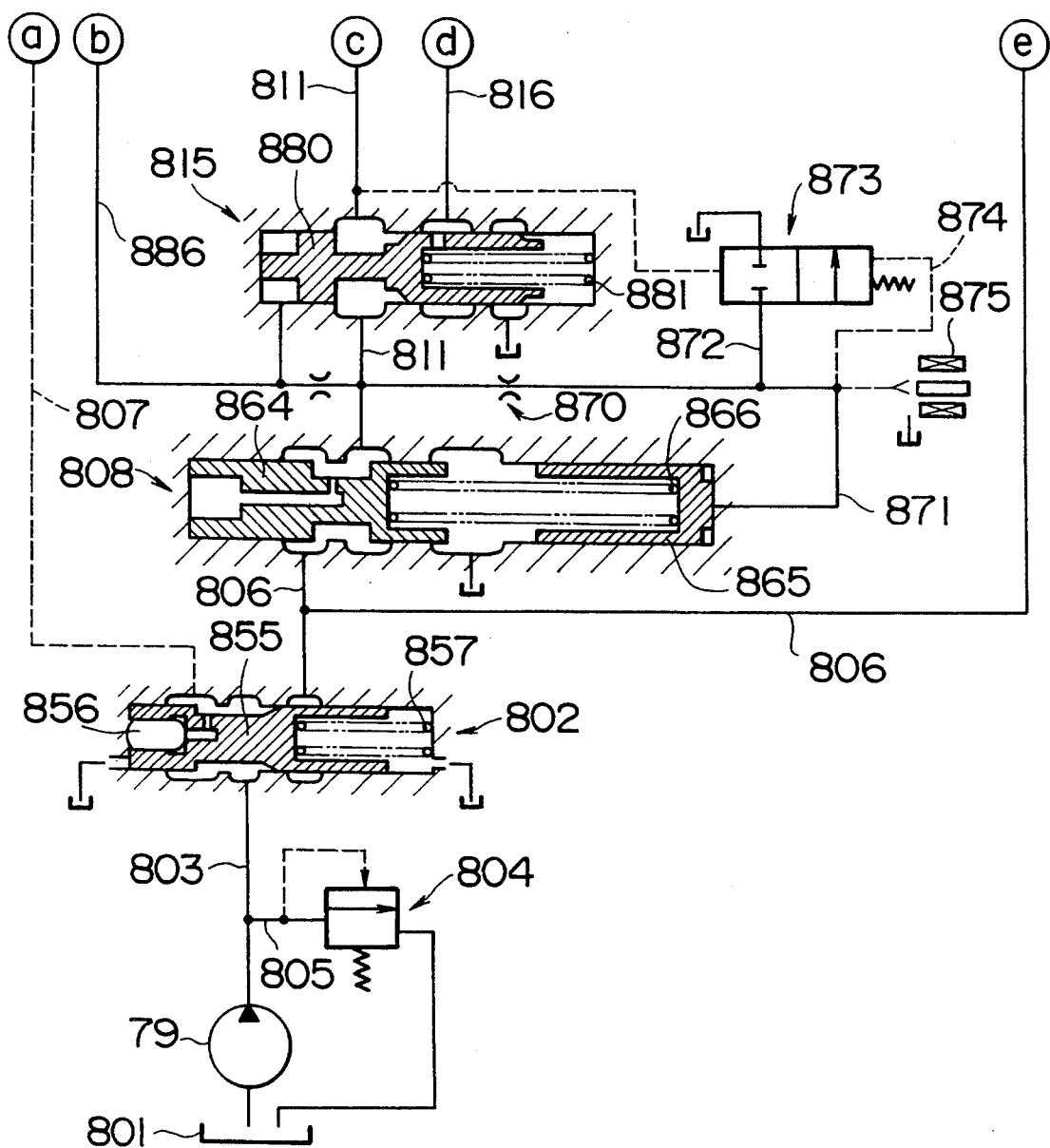
FIG. 14 is a hydraulic circuit diagram illustrating an example of a hydraulic control device in the embodiment together with FIG. 15.
Figure 15:
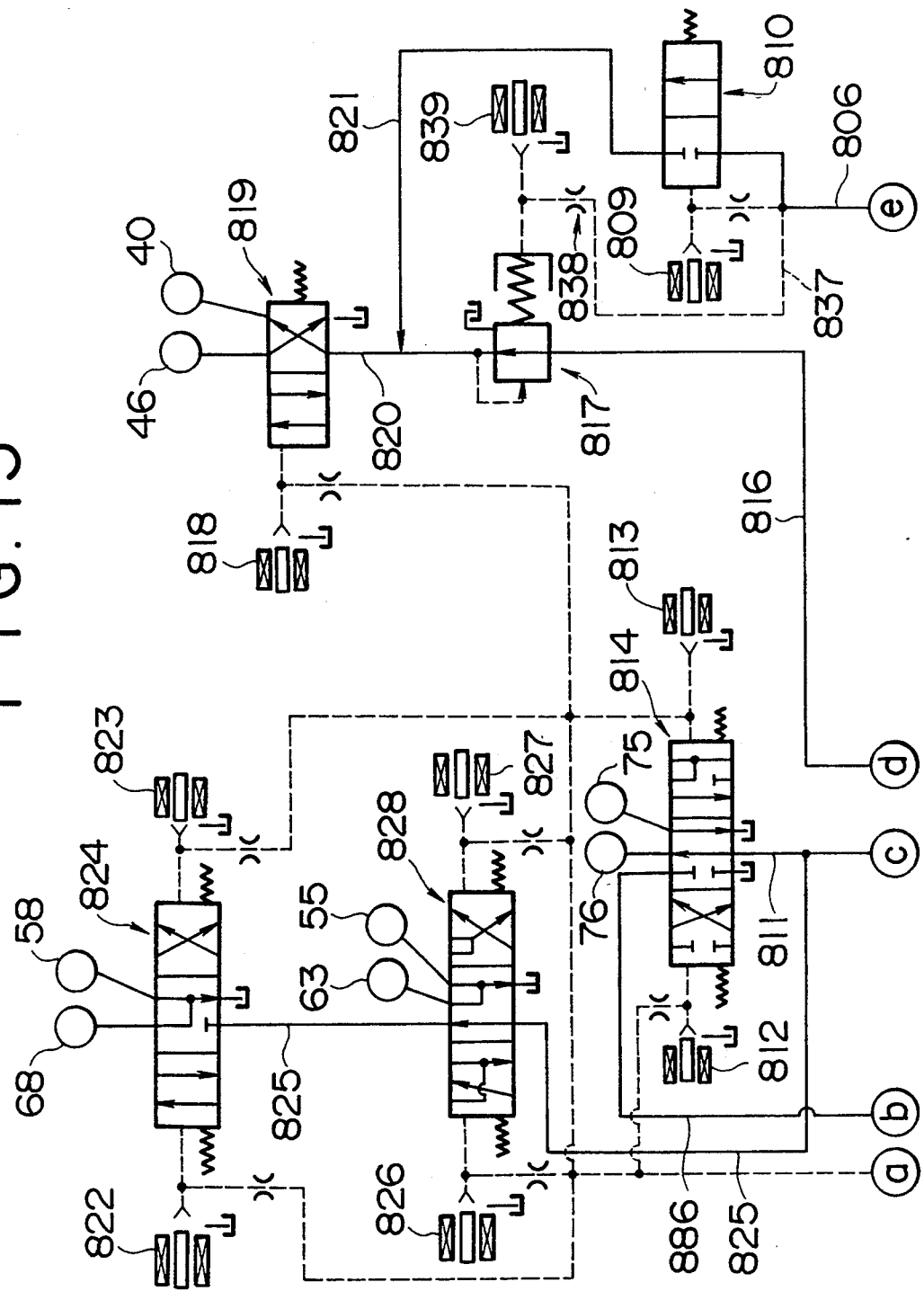
FIG. 15 is a hydraulic circuit diagram illustrating an example of the hydraulic control device in the embodiment together with FIG. 14.

In order to achieve the various transmission stages shown in FIG. 13, time hydraulic control unit 80 for controlling supply and discharge of pressurized oil to time clutches 40 and 46 and the brakes 55, 58, 63, 68, 75 and 76 is assembled in the transmission case 39. FIGS. 14 and 15 schematically illustrate a main portion of the hydraulic control unit in the embodiment. As illustrated in FIGS. 14 and 15, the hydraulic control unit 80 of the embodiment selectively supplies or withdraws pressurized oil sucked up by the hydraulic pump 79 from a sump 801 with respect to a piston device or a servo device not shown of time clutches 40 and 46 and the brakes 55, 58, 63, 68, 75 and 76 in accordance with the operation state of the vehicle. Thus, the unit 80 controls selective engagement or release of the clutches 40 and 46 and the brakes 55, 58, 63, 68, 75 and 76. These basic structure and operation are well known in Japanese Patent Provisional Publication (Kokai) No. 62-255621 (1987) and the like. Accordingly, it is a matter of course that a hydraulic control unit having a structure other than the embodiment described below can be adopted.

More particularly, connected through a pressure adjusting oil path 805 on the way of an oil path 803 connecting the hydraulic pump 79 with a sequence valve 802 is a relief valve 804 for adjusting an oil pressure in the oil path 803 to a previously set desired value hereinafter referred to as a high line pressure) or less.

The sequence valve 802 connected to a main line oil path 806 and a main pilot oil path 807 is to supply the high line pressure supplied from the oil path 803 to the side of the main pilot oil path 807 in advance of the main line oil path 806. A pressure control valve 808 and a bypass valve 810 described later in which a solenoid controlled valve 809 for bypass which is closed upon deenergization is assembled are connected to the main line oil path 806. Further, a high-speed and low-speed switching valve 814 in which a low-speed solenoid controlled valve 813 is assembled and a solenoid controlled valve 812 for neutral which is closed upon deenergization are connected to a high line oil path 811 communicating to the main line oil path 806 through the pressure control valve 808. A pressure reducing valve 815 is mounted on the way of the high line oil path 811.

An inching valve 817 connected to the pressure reducing valve 815 through a low line oil path 816 reduces the pressurized oil of one of the clutches 40 and 46 which is in the engagement state in accordance with an amount of movement of the inching pedal (refer to FIG. 8) driven by operation of the driver to thereby attain the so-called half-clutch state of the engine. Further, the pressure reducing valve 815 adjusts the pressurized oil supplied from the high line oil path side 811 to a previously set desired value (hereinafter referred to as a low line pressure) rather than the high line pressure and supplies it to the low line oil path 816. That is, pressurized oil having lower pressure than that on the side of the brakes 55, 58, 63, 68, 75 and 76 is supplied to the side of the clutches 40 and 46 by means of the pressure reducing valve 815. Thus, the engagement timing of the clutches 40 and 46 at the time of changing the gear is forcedly delayed as compared with the engagement time of the brakes 55, 58, 63, 68, 75 and 76 to thereby mitigate the shock of changing the gear.

The inching valve 817 and a forward and backward switching valve 819 for controlling supply and discharge of pressurized oil to two clutches 40 and 46 for attaining the forward stage and the backward stage, respectively, and in which a backward solenoid controlled valve 818 which is closed upon deenergization is assembled communicate with each other through an oil path 820. The ECU 83 is also supplied with a detection signal from an inching opening detection sensor 110 for detecting an opening of the inching pedal 109. The oil path 820 is connected to the bypass valve 810 through bypass oil path 821.

The high line oil path 811 between the pressure reducing valve 815 and the high- and low-speed switching valve 814 communicates with a 1/5 gear and 3/7 gear switching valve 824 through a high line branch oil path 825 on the way of the high line oil pathe 811. Assembled in the switching valve 824 are a 3/7 gear solenoid controlled valve 822 and a 1/5 gear solenoid controlled valve 823 for controlling supply and discharge of pressurized oil to two brakes 58 and 68 for attaining 3/7 gear and 1/5 gear transmission stages, respectively, and which are closed upon deenergization. A 2/6 gear and 4/8 gear switching valve 828 is mounted on the way of the high line branch oil path 825. Assembled in the switching valve 828 are a 4/8 gear solenoid controlled valve 826 and a 2/6 gear solenoid controlled valve 827 for controlling supply and discharge of pressurized oil to two brakes 55 and 63 for attaining 4/8 gear and 2/6 gear transmission stakes, respectively, and which are closed upon deenergization.

Each of the high-speed and low-speed switching valve 814, the 1/5 gear and 3/7 gear switching valve 824 and the 2/6 gear and 4/8 gear switching valve 828 is a kind of a three-position switching valve having a neutral position. Pressurized oil from main pilot oil path 807 acts to both side of spools not shown of these valves and selective energization to the transmission solenoid controlled valves 812, 813, 822, 823, 826 and 827 is attained. Thus, the spools can be shifted from the neutral position to switch supply and discharge of high line pressure from the high line oil path 811 and the high line branch oil path 825 to the brakes 68, 75 and 76.

A relation of each of the transmission stages and the energization states to the transmission solenoid controlled valves 812, 813, 822, 823, 826 and 827 and the backward solenoid controlled valve 818 is shown in FIG. 16. In FIG. 16, the circle mark represents the energization state of the solenoid controlled valves 812, 813, 818, 822, 823, 826 and 827.

Figure 17:
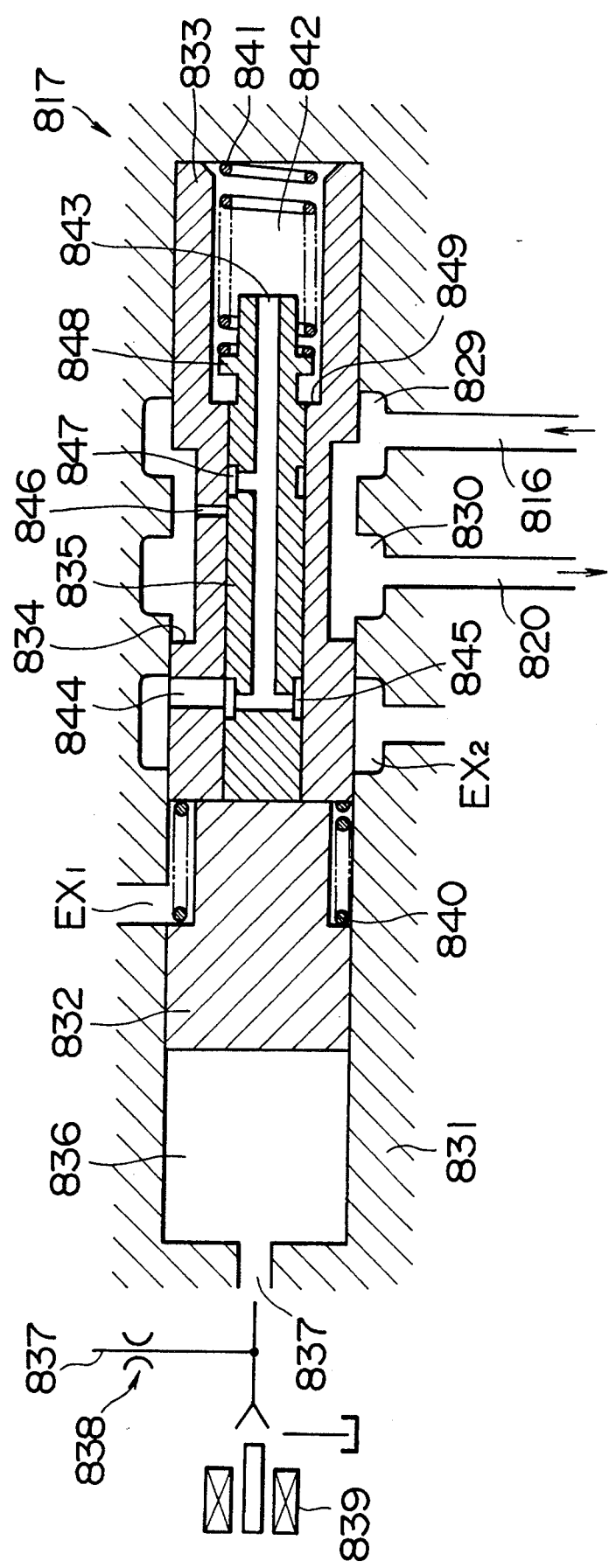
FIG. 17 is an operation principle diagram illustrating enlarged section of a portion of an inching valve in the embodiment together with FIG. 18.
Figure 18:
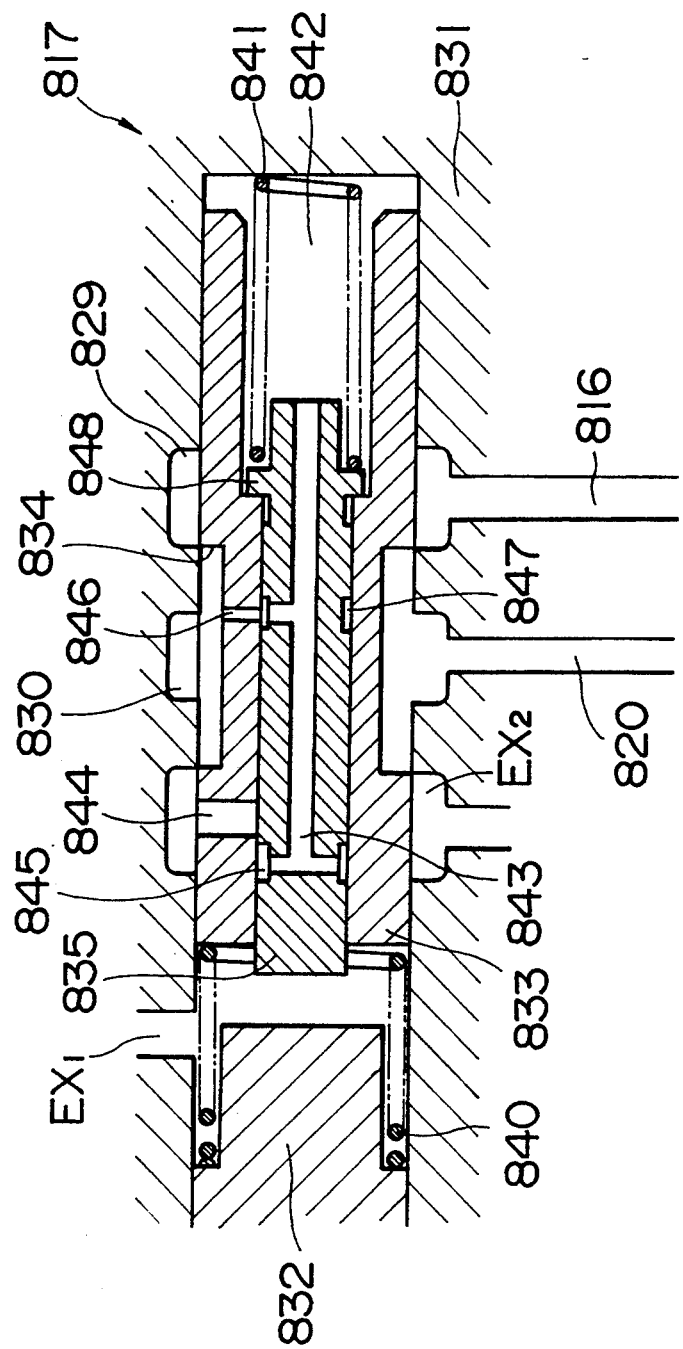
FIG. 18 is an operation principle diagram illustrating enlarged section of a portion of the inching valve in the embodiment together with FIG. 17.

An enlarged sectional structure of a part of the inching valve 827 in the embodiment is schematically illustrated in FIGS. 17 and 18. As illustrated in FIGS. 17 and 18, an inlet port 829 communicating with upstream low line oil path 816, an exit port 830 communicating with downstream oil path 820, and two oil discharge ports $EX_1$ and $EX_2$ connected to the sump 801 are formed in a valve body 831. A control spool 832 and a cylindrical inching pool 833 are slidably fit into the valve body 831. An annular groove 834 for communicating the inlet port 829 and the exit port 830 with an outer periphey or communicating the exit port with the oil discharge port $EX_2$ is formed in the inching spool 833. An inner spool 835 is slidably fit into the inching spool 833.

Figure 19:
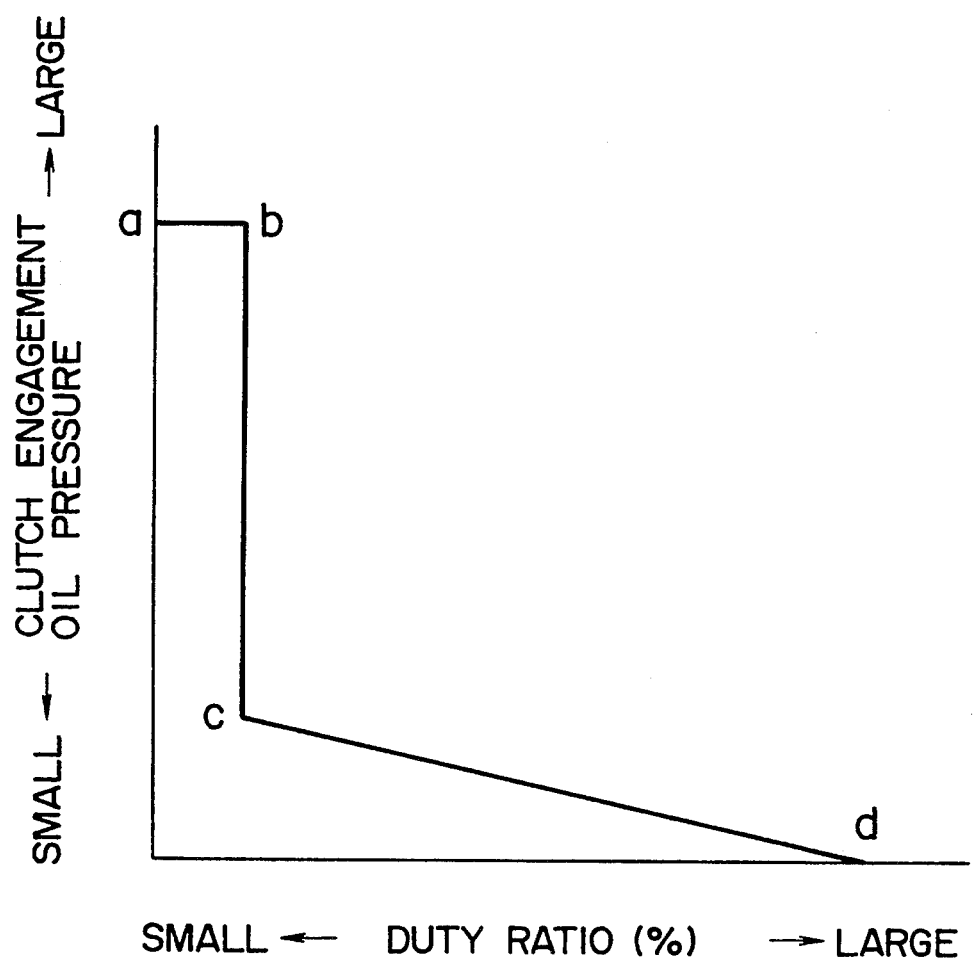
FIG. 19 is a graph illustrating a relation of a duty ratio of a solenoid controlled valve mounted in the inching valve and an engagement hydraulic pressure of a clutch in the embodiment.

A control oil chamber 836 is defined by the valve body 831 and an end surface (left end surface in FIG. 17) of the control spool 832. The control oil chamber 836 communicates with a control oil path 837 branched from the main line oil path 806 in which oil pressurized to high line pressure flows. An inching solenoid controlled valve 839 capable of reducing oil pressure in the control oil path 837 in accordance with an amount of movement of the inching pedal 109 and which is closed upon deenergization is mounted on the way of the control oil path 837 provided with an orifice 838. In the embodiment, a duty ratio of an amount of energization to the inching solenoid controlled valve 839 is increased in proportion to an amount of movement of the inching valve 109. A relation of the duty ratio of the energization amount to the inching solenoid controlled valve 839 and the oil pressure supplied to the side of the clutches 40 and 46 from the oil path has a characteristic as shown in FIG. 19.

Accordingly, a compression Spring 840 having spring force smaller than the high line pressure is mounted between the control spool 832 having an external peripheral surface exposed to the oil discharge port $EX_1$ and an end surface of the inching spool 833. A compression spring 841 for urging the inner spool 835 to other end surface of the control spool 832 is mounted between the other end surface (right side in FIG. 17) of the valve body 831 and the inner spool 835. An oil hole 843 is formed in the middle of the inner spool 835. The oil hole 843 is exposed to a pressurized oil adjusting chamber 842 surrounded by the other end side of the valve body 831 and the other end side of the inching spool 833. An oil discharge hole 845 capable of communicating with the oil discharge port $EX_2$ through an oil hole 844 formed in an end of the inching spool 833 is formed in an end of the oil hole 843. An adjusting oil hole 847 capable of communicating with the inlet port 829 OF the exit port 830 through oil hole 845 exposed to the annular groove 834 formed in the middle of the inching spool 833 is formed on the way of the oil hole 843.

Accordingly, in the state where the inching solenoid controlled valve 839 is in the deenergized state and the high line pressure is supplied from the control oil path 837 to the control oil chamber 836 as it is, the control spool 832 is urged to the right side of the valve body 831 together with the inching spool 833 as illustrated in FIG. 17. Further, the inner spool 835 is urged to the other end surface of the control spool 832 by spring force of the compression coil spring 841. Consequently, the inlet port 829 connected to the upstream low line oil path 816 communicates with the exit port 830 connected to the downstream oil path 820 through the annular groove 834. Low line pressure from the low line oil path 816 is supplied to the clutches 40 and 46 through the oil path 820 and the forward and backward switching valve 819. On the other hand, the pressurized oil adjusting chamber 842 communicates with the oil discharge port $EX_2$ through the oil hole 843, the oil discharge hole 845 and the oil hole 844.

When the driver steps on the inching pedal 109 slightly from this state, the inching sensor 110 detects its opening and an energization amount of a duty ratio corresponding to the detected opening is supplied from the ECU 83 to the inching solenoid controlled valve 839. Thus, pressurized oil in the control oil path 837 disposed downstream of the orifice 838 is discharged to reduce oil pressure in the control oil chamber 836. The control spool 832 and the inner spool 835 are moved until an annular spring receiving portion 848 formed in the other end side of the inner spool 835 abuts against a step 849 formed in an inner peripheral surface of the inching spool 833 by spring force of the pressure coil springs 840 and 841. Consequently, the pressurized oil adjusting chamber 842 communicates with the inlet port 829 through the oil hole 843, the adjusting oil hole 847 and the oil hole 846. Low line pressure is supplied to the pressurized oil adjusting chamber 842. The foregoing description made so far corresponds to the state of the area a to b in FIG. 19.

When the driver steps on the inching pedal still more, pressure exerted on the other end surface of the inner spool 835 is increased as compared with pressure exerted on one end surface of the control spool 832. Accordingly, the inching spool 833 is also moved in response to the pressure balance as shown in FIG. 18, so that the area c to d of FIG. 19 is attained. Consequently, the inching spool 833 can close the inlet port 829 in response to variation of the amount of movement of the inching pedal 109 and at the same time the exit port 830 can communicate with the oil discharge port EX$_2$ through the annular groove 834. By further stepping on the inching pedal 109 in the state illustrated in FIG. 18, pressurized oil supplied to the clutches 40 and 46 is discharged through the forward and backward switching valve 819 and the oil path 820. In this manner, the half-clutch state to the state that the clutches 40 and 46 are opened completely in response to the amount of movement of the inching pedal 109 are attained in the area c to d of FIG. 19.

The bypass valve 810 connecting the main line oil path 806 and the bypass oil path 821 is a kind of a two-position switching valve and is adapted to supply the high line pressure from the main line oil path 806 to the clutches 40 and 46 through the bypass oil path 821, the oil path 820 and the forward and backward switching valve 819 only at the beginning of speed changing. Further, a bypass solenoid controlled valve 809 is a solenoid controlled valve in which an energization state is held during a fixed time by the ECU 83 in response to the speed changing operation and is closed upon deenergization and a pilot pressure branched from the main line oil path 806 urging an end of a spool not shown is reduced by the bypass solenoid controlled valve 809. The main line oil path 806 and the bypass oil path 821 communicate with each other in response to the reduction of the pilot pressure.

More particularly, oil pressure supplied to the clutches 40 and 46 is temporarily reduced in response to the speed change start signal and selective engagement and release operation to the brakes 55, 58, 63, 68, 75 and 76 is made. Thereafter, when pressurized oil is supplied to the clutches 40 and 46 again to engage them, the bypass solenoid controlled valve 809 is in the energization state during a fixed time. The high line pressure from the main line oil path 806 is supplied to the clutches 40 and 46 from the forward and backward solenoid switching valve 819 through the bypass oil path 821 and the oil path 820 temporarily as it is. Consequently, a time required to fill a play until the engagement of the clutches 40 and 46 is started actually can be reduced and a time required to complete the speed change operation can be reduced.

Accordingly, the engagement time to the bypass solenoid controlled valve 809 may be set in accordance with a time required to fill a play until the engagement is started actually when pressurized oil is temporarily discharged from the clutches 40 and 46 in response to the start of speed changing operation and pressurized oil is then supplied again to make the engagement.

Figure 20:
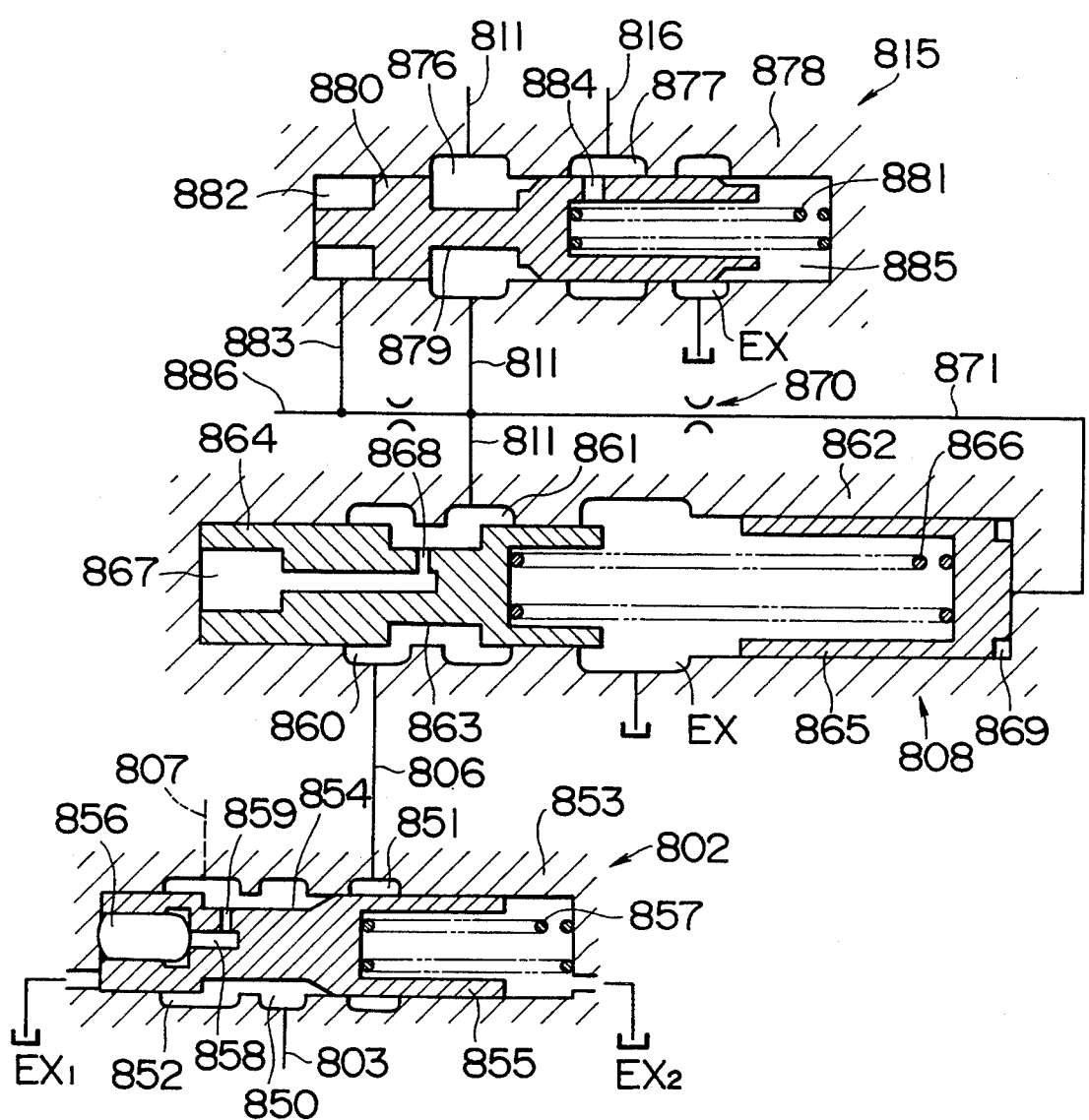
FIG. 20 is an enlarged and extracted sectional view of a sequence valve, a pressure control valve and a pressure reducing valve in the embodiment.

An enlarged sectional structure of portions of the sequence valve 802, the pressure control valve 808 and the pressure reducing valve 815 is schematically illustrated. As illustrated in FIG. 20, an inlet port 850 connected to the oil path 803, a main exit port 851 connected to the main line oil path 806 and a pilot exit port 852 connected to the main pilot oil path 807 are formed in the sequence valve 802. Further, the sequence valve 802 includes a valve body 853 having the oil discharge ports EX$_1$ and EX$_2$ communicating with the sump 801, a spool 855 having a center portion in which an annular groove 854 is formed, a plug 856 which is slidably fit into an end side (left side in FIG. 20) of the spool 855, and a compression coil spring 857 mounted between the spool 855 and the valve body 853 to urge the spool 855 to the plug 856. An oil chamber 858 surrounded by the spool 855 and the plug 856 is in the communication state with the annular groove 854 through an oil hole 859.

Accordingly, in the state where the high line pressure is not supplied from the oil path 803 to the inlet port 850, the spool 855 is pressed to an end side of the valve body 853 by spring force of the compression coil spring 857 as shown in FIG. 20 and the main exit port 851 is closed by the spool 855. When the high line pressure is supplied from the oil path 803 to the inlet port 850, the high line pressure is supplied to the pilot oil path 807 from the pilot exit port 852 communicating with the inlet port 850 through the annular groove 854. Pilot pressure from the main pilot oil path 807 acts on the high-speed and low-speed switching valve 814, the forward and backward switching valve 819, the 1/5 gear and 3/7 gear switching valve 824 and the 2/6 gear and 4/8 gear switching valve 828.

As the pressurized oil of the high line pressure is further supplied to the sequence valve 802 subsequently to the above state, the high line pressure is supplied from the oil hole 859 to the oil chamber 858. The spool 855 is moved to the other end side (right side of FIG. 20) of the valve body 853 gradually against spring force of the compression coil spring 857. Consequently, the inlet port 850 communicates with the main exit port 851 through the annular groove 854. On the other hand, the pilot exit port 852 is closed by the spool 855 and the high line pressure is supplied from the main line oil path 806 to the pressure control valve 808.

When pressurized oil in the oil chamber 858 is discharged from the oil discharge port EX$_1$ through a gap between the spool 855 and the plug 856, the spool 855 is pressed back again by spring force of the compression coil spring 857. Thus, the inlet port 850 communicates with the pilot exit port 852.

The pressure control valve 808 functions to increase supply oil pressure to the brakes 55, 58, 63, 68, 75 and 76 and the clutches 40 and 46 from low pressure to high pressure gradually upon speed changing and includes a valve body 862, a spool 864, a piston 865 and a compression coil spring 866. The valve body 862 includes an inlet port 860 connected to the main line oil path 806, an exit port 861 connected to the high line oil path 811 and an oil discharge port EX communicating with the sump 801. Further, an annular groove 863 capable of communicating with the inlet port 860 and the exit port 861 is formed in the middle of the spool 864. The piston 865 has a diameter larger than that of the spool 864. The compression coil spring 866 is mounted between the piston 865 and the spool 864. An oil chamber 867 having an opening formed in an end of the spool 864 is formed in the spool 864. The oil chamber 867 and the annular groove 863 communicate with each other through an oil hole 868. A pressure adjusting chamber 869 defined by the other end side of the valve body 862 and the piston 865 is connected to the high line oil path 811 through a pressurized oil adjusting path 871 having an orifice 870 formed on the way of the chamber.

In the speed changing operation, pressurized oil in the path 871 is discharged rapidly, the piston 865 is returned to the state of FIG. 20 rapidly, and further pressure of pressurized oil supplied from the high line oil path 811 is changed to a minimum state. Accordingly, a switching valve 873 is mounted on the way of an oil discharge path 872 branched from the path 871. The switching valve 873 functions to exert pilot pressure from the high line oil path 811 and the pressurized oil adjusting path 871 onto both sides of a spool not shown. Further, a solenoid controlled valve 875 for duty controlling a rising of oil pressure in the path 871 in the speed changing operation and which is closed upon deenergization is disposed on the way of a pilot oil path 874 leading pilot pressure from the path 871.

Accordingly, when the speed changing operation is started in the state illustrated in FIG. 20, pressurized oil is discharged from the brakes 55, 58, 63, 68, 75 and 76 being in the engagement state. Thus, pilot pressure in the opposite side of the pilot oil path 874 is temporarily reduced in response to the discharging. A position of the switching valve 873 is switched and pressurized oil in the pressure adjusting chamber 869 is discharged from the path 871 through the oil discharge path 872. Consequently, the piston 865 is displaced to the other end side of the valve body 862 rapidly. Since pressurized oil of the high line pressure begins to be supplied from the main line oil path 806 through the high line oil path 811 having reduced oil pressure, pilot pressure in the opposite side of the pilot oil path 874 is increased again and a position of the switching valve 873 is switched to the original state illustrated in FIG. 14. Oil pressure in the pressure adjusting path 871 and the pressure adjusting chamber 869 is increased and the piston 865 is pressed to an end side of the valve body 862 against spring force of the compression coil spring 866. Further, supply oil pressure to the clutches 40 and 46 and the brakes 55, 58, 63, 68, 75 and 76 is increased gradually.

At this time, by duty controlling the engagement state with respect to the solenoid controlled valve 875, an increasing rate of the supply oil pressure to the clutches 40 and 46 and the brakes 55, 58, 63, 68, 75 and 76 can be corrected to be slow, so that the speed changing operation having little shock can be realized.

The pressure reducing valve 815 includes a valve body 878, a spool 880 and a compression coil spring 881. A through port 876 straddling the high line oil path 811, an exit port 877 connected to the low line oil path 816 and an oil discharge port EX communicating with the sump 801 are formed in the valve body 878. An annular groove 879 disposed slidably in the valve body 878 and opposite to the through port 876 is formed in an outer peripheral surface of the spool 880. The compression coil spring 881 functions to urge the spool 880 to an end side (left side of FIG. 20) of the valve body 878. A control oil path 883 branched from the high line oil path 811 between the pressure control valve 808 and the pressure reducing valve 815 communicates with a control oil chamber 882 formed between an end of the valve body 878 and the spool 880. Further, a pressure adjusting chamber 885 capable of communicating with the exit port 877 through an oil hole 884 formed in the other end of the spool 880 is formed between the other end of the valve body 878 and the spool 880.

Accordingly, in the state shown in FIG. 20, when high line pressure is supplied to the through port 876 and the control oil chamber 882 from the high line oil path 811 and the control oil path 883, the spool 880 is moved to the other end side of the valve body 878 against spring force of the compression coil spring 881 by a difference of a pressure receiving area of the high line pressure. Thus, the through port 876 communicates with the exit port 877. Consequently, high line pressure from the high line oil path 811 is supplied to the low line oil path 816. Further, the high line pressure is supplied to the pressure adjusting chamber 885 from the oil hole 884.

At this time, the oil discharge port EX is closed by the spool 880. Further, the spool 880 is pushed back to one end side of the valve body 878 by oil pressure of the pressure adjusting chamber 885 and spring force of the compression coil spring 881. Consequently, the pressure adjusting chamber 885 communicates with the oil discharge port EX to reduce oil pressure of the low line oil path 816. In this way, the spool 880 is moved in the valve body 878 in reciprocating manner so that pressurized oil supplied to the low line oil path 816 is adjusted to low line pressure.

When the P range is selected by the shift lever 82, only the neutral solenoid controlled valve 812 is energized. Pressurized oil is discharged from all of the brakes 55, 58, 53, 68, 75 and 76 and only the forward clutch 46 becomes the engagable state. In this case, however, pressurized oil in the control oil chamber 882 is discharged through oil path 886 connecting the high-speed and low-speed switching valve 814 and the control oil path 883. Accordingly, the spool 880 of the pressure reducing valve 883 becomes the state shown in FIGS. 14 and 20. Pressurized oil supplied to the forward clutch 46 is discharged from the oil discharge port EX of the pressure reducing valve 815 through the oil path 820, the inching valve 817 and the low line oil path 816. As a result, the forward clutch 46 is substantially opened to attain the neutral state in which driving force is not transmitted from the input axis 34 of the transmission to the driving gear 44. On the other hand, in the P range, the mechanical hydraulic brake 108 becomes the engagement state by an actuator not shown and restricts rotation of the output axis 70 of the transmission mechanically.

When the N range is selected by the shift lever 82, only the neutral solenoid controlled valve 812 is energized in the same manner as in the P range. Pressurized oil is discharged from all of the brakes 55, 58, 63, 68, 75 and 76 and only the forward clutch 46 becomes the engagable state. However, the forward clutch 46 is substantially opened to attain the neutral state in which driving force is not transmitted from the input axis 34 of the transmission to the driving gear 44. In this case, it is a matter of course that the mechanical hydraulic brake 108 is in the open state.

Figure 21:
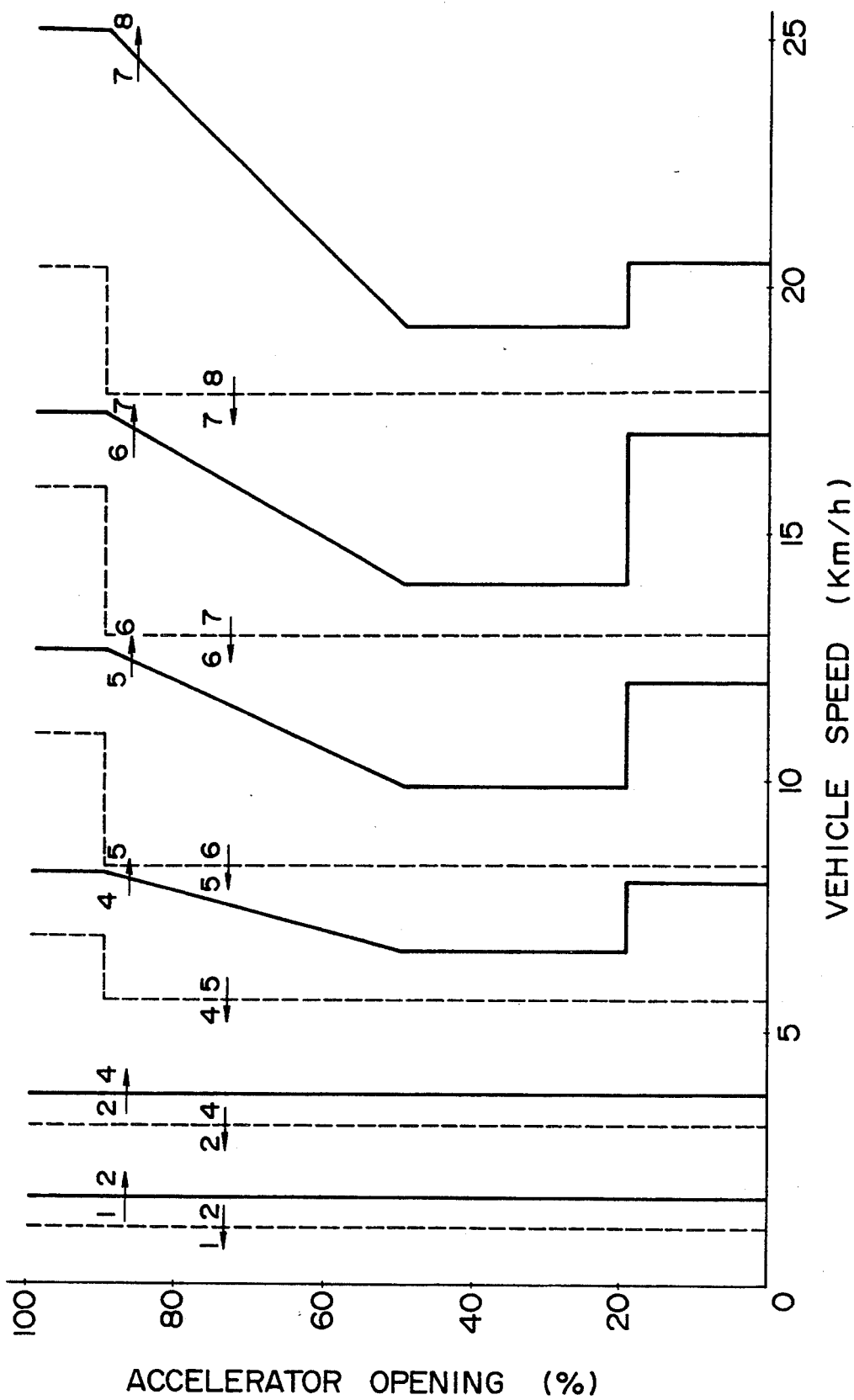
FIG. 21 is a transmission map illustrating a relation of speed of a vehicle, accelerator openings and transmission stages at a power mode in the embodiment.

When the D range is selected by the shift lever 82, the ECU 83 reads a transmission stage optimum to the current operation state from a map as shown in FIG. 21 in an ROM stored previously in the ECU 83 on the basis of detection signals from the speed sensor 87 and the accelerator opening sensor 90. When the optimum transmission stage is not coincident with the current transmission stage, the ECU 83 makes the transmission operation to be described below automatically. In this case, the current transmission stage is calculated in the ECU 83 on the basis of output signal of the ECU 83 to the transmission solenoid controlled valves 812, 813, 818, 822, 823, 826 and 827.

More particularly, when the transmission or speed change start signal is produced, the energization state to the transmission solenoid controlled valves 812, 813, 822, 823, 826 and 827 is selectively switched in response to the signal. In this case, as described above, the switching valve 873 opens the oil discharge path 872 temporarily to move the piston 865 of the pressure control valve 808 to the right side in the figure rapidly. Accordingly, the high line pressure of the high line oil path 811 just after the speed change start is in the reduced state to a minimum value and the high line pressure is slowly increased from this state with the duty of a solenoid controlled valve 875. Thus, the smooth speed change operation having little shock is attained.

At this time, the main line oil path 806 and the bypass oil path 821 communicate with each other temporarily through the bypass valve 810 by means of the bypass solenoid controlled valve 809 in parallel with rising of the high line pressure. Consequently, the high line pressure is supplied to the clutches 40 and 46 from the oil path 820 through the forward and backward switching valve 819 to fill a play rapidly and time until the completion of the speed change can be shortened even if the engagement operation by low line pressure is made.

The transmission map or speed change map shown in FIG. 21 is a power made map in which the transmission stage on the side of the low speed is held with respect to an amount of movement of the accelerator pedal 89 and driving force of the engine 31 is taken out. In the embodiment, however, there is further provided a transmission map of an economical mode not shown in which the transmission stage facilitates to move to the high speed side with respect to an amount of movement of the accelerator pedal to save fuel. Accordingly, a fuel consumption mode change-over switch 111 capable of switching the power mode and the economical mode is provided in a cabin not shown. A detection signal from the fuel consumption mode change-over switch 111 is supplied to the ECU 83.

Information of the transmission mode selected by the switch 111 is displayed in an operation state display unit 112 disposed in a steering console not shown in the cabin. However, information of the current position of the transmission stage and the shift lever 82 is also displayed in the operation state display unit 112 simultaneously.

As apparent from the transmission map shown in FIG. 21, in the embodiment, the transmission operation to the 3-gear transmission stage having the transmission ratio which is very close to 2-gear and 4-gear is not made in the automatic transmission at the D, 5 and 3 range. Accordingly, the so-called jumping transmission operation is automatically made between the 2-gear and 4-gear.

In the state of the automatic transmission mode in which the D range is selected by the shift lever 82, when the transmission mode change-over switch 91 is operated once, the mode is changed to a manual transmission mode desired by the driver and the current transmission stage is held as it is. When the shift lever 82 is once operated to the UP position, for example, an output signal from the reference position sensor becomes off and an output signal from the up shift switch 102 becomes on. The ECU 83 makes transmission operation of up shift for shifting up the transmission stage by one stage in response to the above output signals. This transmission operation itself is made in the same manner as the transmission operation in the D range described above.

When the transmission stage is changed from the high gear stage to the low gear stage, for example, when the shift lever 82 is operated five times from the 8-gear position to the DW position successively so that rapid down shift to the 3-gear stage is desired, there is a problem that the rotational speed of the engine may exceed a dangerous speed even if the change of the transmission stage is made as it is and accordingly the transmission operation is not started until the rotational speed of the engine is reduced to a safe rotational speed. Similarly, when the forward and backward switching lever 81 is operated to change a running direction of the vehicle, the transmission operation is not made until the vehicle is stopped completely on the basis of the detection signal from the speed sensor 87. This is the same for the automatic transmission operation in which the D, 5- or 3-range is selected.

When the 5-range is selected by the shift lever 82, the transmission operation is automatically made in accordance with the transmission map of the economical mode of FIG. 21 or not shown on the basis of the detection signal from the speed sensor 87 and the accelerator opening sensor 90. However, in the 5-range, the high-speed gear stage of the 6-gear or more is all clipped to the transmission stage of the 6-gear and the transmission stage is not shifted to the high-speed gear stage of the 7-gear or more. Even in this case, the transmission stage of the 3-gear is not selected and the jumping transmission operation between the 2-gear and 4-gear is made automatically in the same manner as the D range.

Similarly, when the 3-range is selected by the shift lever 82, the transmission operation is automatically made in accordance with the transmission map of the economical mode of FIG. 21 or not shown on the basis of the detection signal from the speed sensor 87 and the accelerator opening sensor 90. However, in the 3-range, the high-speed gear stage of the 6-gear or more is all clipped to the transmission stage of the 4-gear and the transmission stage is not shifted to the high-speed gear stage of the 5-gear or more. Even in this case, the transmission stage of the 3-gear is not selected and the jumping transmission operation between the 2-gear and 4-gear is made automatically in the same manner as the D range and 5-gear.

Figure 22:
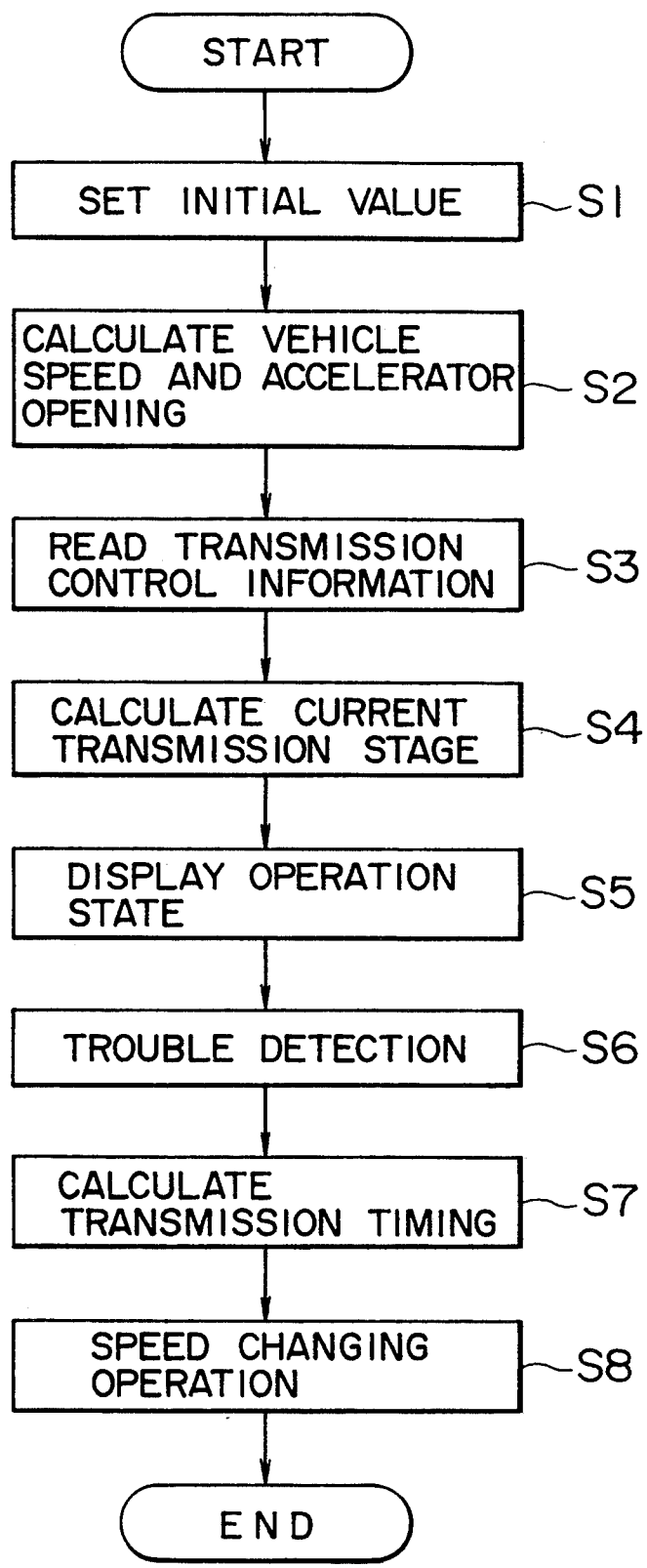
FIG. 22 is a flow chart showing a procedure a main portion in the embodiment.
Figure 23:
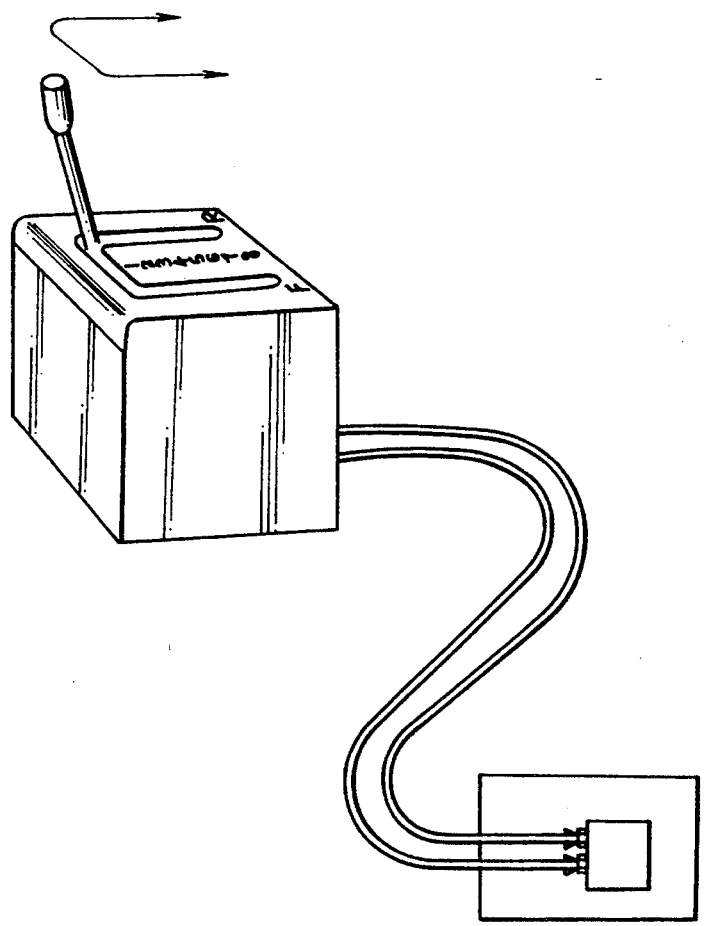
FIG. 23 is a perspective view schematically illustrating an example of a conventional transmission for a vehicle.
Figure 24:
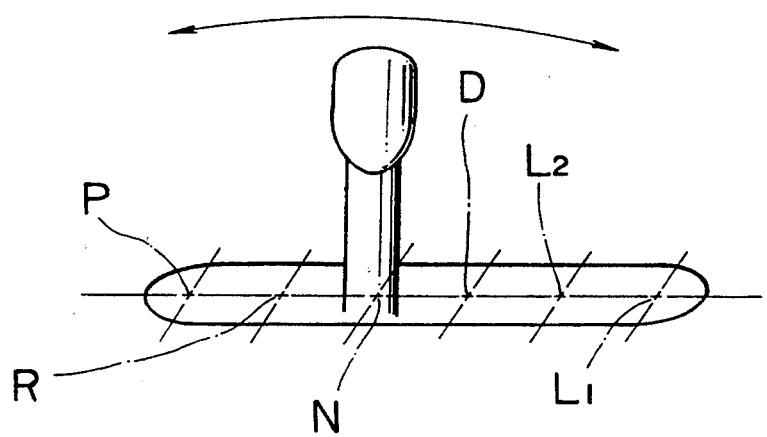
FIG. 24 is a perspective view illustrating another example of a conventional automatic transmission for a vehicle.

A flow of the process of the transmission operation is shown in FIG. 22. In response to a turning-on operation of an ignition switch not shown, in step S1, various initial values for control of the operation state of the engine 31 and the transmission control are set. Then, in step S2, a speed of the vehicle is calculated on the basis of the detection signal from the speed sensor 87 and the accelerator opening is calculated on the basis of the detection signal from the accelerator opening sensor 90.

In step S3, respective selection positions of the forward and backward change-over switch 81, the shift position sensor 88 and the fuel consumption mode change-over switch 111 are detected. The current transmission stage is calculated in step S4 on the basis of the output signals to the high-speed and low-speed switching valve 814, the forward and backward switching valve 819, the 1/5-gear and 3/7-gear switching valve 824 and the 2/6-gear and 4/8-gear switching valve 828.

Further, in step S5, the above information is supplied to the operation state display unit 112. Then, in step S6, an operation error or trouble in the ECU 83 is detected, and if detected, the detected error or trouble is supplied to the operation state display unit 112.

Thereafter, the speed information and the accelerator opening information are compared with the transmission map of the economic mode of FIG. 21 or not shown selected by the fuel consumption mode change-over switch 111 in step S7 and an ideal transmission timing with respect to a position of the shift lever 82 in the shift position sensor 88 is calculated. The calculated timing is supplied to the hydraulic control unit 80 to attain a desired transmission operation in step S8.

The above steps S1 to S8 are repeatedly made for each control cycle of the system until the ignition key switch not shown is turned off.

In the embodiment, there is provided an emergency electronic control unit 113 capable of making manual transmission operation forcedly when the ECU 83 is failed. A power supply change-over switch 114 for operating any one of the ECU 83 and the emergency electronic control unit 113 and a position change-over switch 115 capable of selecting the positions of F2 (forward 2-gear), N (neutral) and R2 (backward 2-gear) for emergency escape capable of attaining the transmission stage for the forward 2-gear, neutral and backward 2-gear without operation of the forward and backward change-over switch and the shift lever 82 are assembled in the emergency electronic control unit 113.

Accordingly, when the power supply change-over switch 114 is operated to select operation of the ECU 83, the power supply 116 and the ECU 83 are electrically connected to each other. On the other hand, supply of electric power to the emergency electronic control unit 113 is cut off and the above-described normal transmission operation can be made.

When the ECU 83 is not operated normally due to any cause, information that any trouble occurs in the ECU 83 is displayed in the operation information display unit 112. Accordingly, the driver operates the power supply change-over switch 114 on the basis of the information. Thus, operation of the emergency electronic control unit 113 is selected and the power supply 116 and the emergency electronic control unit 113 are electrically connected to each other. On the other hand, supply of electric power to the ECU 83 is cut off and the transmission stage corresponding to the position of the position change-over switch 115 is attained by means of the hydraulic control unit 80.

We claim:

1. An electronically controlled automatic transmission for vehicles having a shift lever which is moveable in a longitudinal shift path parallel to the direction of a vehicle to automatically switch a gear state to a speed change pattern indicated by a stop position of the shift lever, comprising a transverse shift path intersecting said longitudinal shift path at the stop position of the shift lever, wherein the shift lever is moveable from said longitudinal shift path to said transverse shift path so as to switch a gear stage of said transmission from an automatic speed change stage to a manual speed change stage.

2. The electronically controlled automatic transmission for vehicles according to claim 1, wherein the gear stage is manually shifted to a high-speed gear stage through a number of stages corresponding to movement of said shift lever from an automatic speed change position in said longitudinal shift path to said transverse shift path, while the gear stage is manually shifted to a low-speed gear stage through a number of stages corresponding to movement of said shift lever from said transverse shift path to an automatic speed change position in said longitudinal shift path.

3. The electronically controlled automatic transmission for vehicles according to claim 1, comprising a plurality of position detectors connected through an electronic control unit to said automatic transmission for detecting various speed change positions of said shift lever in said longitudinal shift path.

4. An electronically controlled automatic transmission for vehicles having a shift lever which is moveable in a longitudinal shift path parallel to the direction of a vehicle to automatically switch a gear state to a speed change pattern indicated by a stop position of the shift lever, comprising a transverse shift path intersecting said longitudinal shift path at the stop position of the shift lever, wherein the shift lever is moveable from said longitudinal shift path to said transverse shift path so as to switch a gear stage of said transmission from an automatic speed change stage to a manual speed change stage; wherein said shift lever includes a push button switch which is pressed during operation of the vehicle when said shift lever is an automatic speed change position in said longitudinal shift path to fix the gear stage in the manual speed change stage during operation and when said push button switch is pressed once more, the gear stage is switched to the automatic speed change stage.

5. An electronically controlled automatic transmission for vehicles having a shift lever which is moveable in a longitudinal shift path parallel to the direction of a vehicle to automatically switch a gear stage to speed change pattern indicated by a stop position of the shift lever, comprising a transverse shift path intersecting said longitudinal shift path at the stop position of the shift lever, wherein the shift lever is moveable from said longitudinal shift path to said transverse shift path so as to switch a gear stage of said transmission from an automatic speed change to a manual speed change stage; wherein said shift lever includes a push button switch and when said shift lever is in an automatic speed change position in said longitudinal shift path and the gear stage during operation is fixed by said push button switch, said shift lever is moved from the automatic speed change position within said longitudinal shift path so that the fixing of the gear stage is released.

6. An electronically controlled automatic transmission for vehicles having a shift lever which is moveable in a longitudinal shift path parallel to the direction of the vehicle to automatically switch a gear stage to a speed change pattern indicated by the stop position of the shift lever, comprising a transverse shift path intersecting said longitudinal shift path at the stop position of the shift lever, wherein the shift lever is moveable from said longitudinal shift path to said transverse shift path so as to switch a gear stage of said transmission from an automatic speed change stage to a manual speed change stage, said shift lever is in a manual speed change position in which a speed change stage is selected by operation of a driver and can be switched to a desired speed change stage position and an automatic speed change position in which a speed change stage is automatically switched in accordance with the running state of a vehicle, running state detection means for detecting a running state of a vehicle, and an electronic control unit for controlling selective supply and discharge of pressurized oil to the brakes and clutches on the basis of signals from said running state detection means and said shift lever to be able to attain a predetermined speed change stage.

7. The electronically controlled automatic transmission for vehicles according to claim 6, further comprising a speed sensor for detecting a running speed of vehicle.

8. The electronically controlled automatic transmission for vehicles according to claim 6, further comprising an accelerator opening sensor for detecting an amount of movement of an accelerator pedal.

* * * * *